US008129879B2

(12) United States Patent
Uchimura

(10) Patent No.: US 8,129,879 B2
(45) Date of Patent: Mar. 6, 2012

(54) ELECTRIC MOTOR AND OPENING/CLOSING APPARATUS FOR VEHICULAR OPENING/CLOSING BODY EMPLOYING THE ELECTRIC MOTOR

(75) Inventor: Hiroyuki Uchimura, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 315 days.

(21) Appl. No.: 12/439,171

(22) PCT Filed: Aug. 23, 2007

(86) PCT No.: PCT/JP2007/066362
§ 371 (c)(1),
(2), (4) Date: Feb. 27, 2009

(87) PCT Pub. No.: WO2008/026503
PCT Pub. Date: Mar. 6, 2008

(65) Prior Publication Data
US 2009/0255186 A1    Oct. 15, 2009

(30) Foreign Application Priority Data
Aug. 31, 2006    (JP) .................................. 2006-236872

(51) Int. Cl.
H02K 11/00 (2006.01)
H02K 13/00 (2006.01)
H01R 39/38 (2006.01)
(52) U.S. Cl. ............ 310/71; 310/239; 310/242; 310/244
(58) Field of Classification Search .................... 310/71, 310/239, 242, 244
See application file for complete search history.

(56) References Cited

U.S. PATENT DOCUMENTS
6,357,425 B2 *   3/2002   Fujita et al. .............. 123/568.21
(Continued)

FOREIGN PATENT DOCUMENTS
EP        1564867 A1 *   8/2005
(Continued)

OTHER PUBLICATIONS
Translation of foreign document JP 2006101615 A.*
(Continued)

Primary Examiner — Quyen Leung
Assistant Examiner — Alex W Mok
(74) Attorney, Agent, or Firm — McCormick, Paulding & Huber LLP

(57) ABSTRACT

Connector side terminals 43b and 44b protruding from a connector portion 36, and front-side and back-side power supply terminals protruding from the holder main body 34 are provided to first and second lead plates 43 and 44 formed by metal plates with a conductive property, and they are embedded into a brush holder 31 formed integrally with the connector portion 36 and a holder main body 34 via a coupling portion 35. The connector side terminals 43b and 44b are disposed so as to match their width directions with an axial direction of a commutator 23 and to be mutually aligned in the width directions, and the main body portions 43a and 44a are twisted perpendicularly to the connector side terminals 43b and 44b with reference to their axes at a base end of the connector portion 36, and are disposed in the coupling portion 35 so as to match their thickness directions with the axial direction of the commutator 23 and to be mutually aligned in the width directions.

8 Claims, 13 Drawing Sheets

U.S. PATENT DOCUMENTS

| | | | |
|---|---|---|---|
| 6,577,029 B1 * | 6/2003 | Weber et al. | 310/68 R |
| 6,677,693 B2 * | 1/2004 | Ooyama | 310/239 |
| 6,819,019 B2 * | 11/2004 | Tamura et al. | 310/71 |
| 6,849,986 B2 * | 2/2005 | Wong | 310/239 |
| 6,922,003 B2 * | 7/2005 | Uchida | 310/239 |
| 6,975,059 B2 * | 12/2005 | Sakai et al. | 310/239 |
| 2001/0026104 A1 * | 10/2001 | Shimizu et al. | 310/71 |
| 2002/0117915 A1 * | 8/2002 | Shina et al. | 310/71 |
| 2003/0178908 A1 * | 9/2003 | Hirano et al. | 310/239 |
| 2004/0061411 A1 * | 4/2004 | Tyshchuk et al. | 310/239 |
| 2004/0066111 A1 * | 4/2004 | Torii | 310/239 |
| 2004/0070292 A1 * | 4/2004 | Fujita et al. | 310/71 |
| 2004/0201295 A1 * | 10/2004 | Hama et al. | 310/71 |
| 2004/0201296 A1 * | 10/2004 | Hama et al. | 310/71 |
| 2004/0245885 A1 * | 12/2004 | Bruhn et al. | 310/239 |
| 2005/0184606 A1 * | 8/2005 | Kokubu et al. | 310/75 R |
| 2006/0043803 A1 * | 3/2006 | Yagi | 310/68 B |
| 2006/0163958 A1 * | 7/2006 | Yagi et al. | 310/71 |
| 2006/0232152 A1 * | 10/2006 | Becker et al. | 310/71 |
| 2006/0238045 A1 * | 10/2006 | Hatano et al. | 310/71 |

FOREIGN PATENT DOCUMENTS

| | | |
|---|---|---|
| JP | 2003079109 A | 3/2003 |
| JP | 2006101615 A | 4/2006 |
| WO | WO 2005107045 A1 * | 11/2005 |

OTHER PUBLICATIONS

International Search Report for PCT/JP2007/066362 dated Sep. 18, 2007.

Office Action issued from the Japan Patent Office in corresponding Japanese Patent Application No. 2006-236872 dated May 31, 2011.

* cited by examiner

ELECTRIC MOTOR AND OPENING/CLOSING APPARATUS FOR VEHICULAR OPENING/CLOSING BODY EMPLOYING THE ELECTRIC MOTOR

CROSS REFERENCE TO RELATED APPLICATIONS

This application is entitled to the benefit of and incorporates by reference essential subject matter disclosed in International Patent Application No. PCT/JP2007/066362 filed on Aug. 23, 2007 and Japanese Patent Application No. 2006-236872 filed on Aug. 31, 2006.

TECHNICAL FIELD

The present invention relates to an electric motor, which is equipped with a brush holder, the brush holder being formed by a resinous material and integrally with: a holder main body disposed inside a motor housing and retaining a pair of brushes slidably contacting with a commutator; a power-supply connector portion disposed outside the motor housing and connected detachably to an external connector; and a coupling portion provided protrudingly from the holder main body outside the motor housing and coupling the holder main body and the connector portion, and also relates to an opening/closing apparatus for a vehicular opening/closing body employing this electric motor.

PRIOR ART

Conventionally, an electric motor with brushes is frequently employed as a driving source, such as a power window device and a sunroof device, provided on a vehicle. This type of electric motor with brushes has a motor yoke (motor housing), to whose inner periphery a pair of magnets is fixed, and an armature accommodated rotatably in this motor yoke, and the armature is provided with a plurality of armature coils. Coil ends of these armature coils are connected to respective corresponding segments of a commutator, and this commutator is fixed to an armature shaft and rotates with the armature shaft. Also, a resin-made brush holder is disposed inside the motor yoke, and a pair of brushes which contact slidably with the commutator is retained by this brush holder. And, when power is supplied to each brush from a power source, this power is supplied to the armature coils via the commutator, thereby causing the armature shaft to rotate.

Also conventionally, a technology has been known in which a power-supply connector portion is formed integrally with the holder main body of the brush holder via a coupling portion, and the power is supplied to each brush by connecting an external connector from a power source to this connector portion. In this case, a pair of lead members, formed by a metal plate with a conductive property such as a steel plate, is embedded alongside inside the brush holder by insert molding using a mold, and power-supply terminals of the external connector connected to the connector portion are connected to the respective brushes via these lead members.

For example, Japanese Patent Application Laid-Open Publication No. 2003-79109 describes an electric motor provided with the brush holder in which in a coupling portion that couples a holder main body of a brush holder and a connector portion, main body portions of a pair of lead members are embedded so as to match their thickness directions with an axial direction of a commutator and to be mutually aligned in their width directions, and which by bending the respective main body portions in the axial direction of the commutator, a connector side terminal protruding from a connector portion is disposed so as to match their width directions with a radial direction of the commutator.

DISCLOSURE OF THE INVENTION

However, in the brush holder shown in Japanese Patent Application Laid-Open Publication No. 2003-79109, because the pair of connector side terminals disposed in the connector portion is disposed alongside so as to match their width directions with the radial direction of the commutator, a thickness dimension of the connector portion toward the radial direction of the commutator becomes larger. Therefore, in a case where the electric motor equipped with this brush holder is used as an electric motor of an opening/closing apparatus for a vehicular opening/closing body such as a power window motor, which is required to be thin in dimension, as the thickness dimension in the radial direction of the commutator is larger, wall thickness becomes larger, which results in detracting from its layout characteristics.

In contrast, a structure is conceivable in which the respective connector side terminals are disposed alongside of the connector portion so as to match their width directions with the axial direction of the commutator. However, in this structure, the main body portions, which are bent with respect to the connector side terminals, are disposed in the coupling portion of the brush holder so that their width directions are directed toward the axial direction of the commutator, and that the respective main body portions are parallel. Therefore, in a structure in which the connector is extracted outside while the brush holder is clamped and fixed between a pair of motor housings, there arises the problem that as a portion clamped by the brush holder becomes thick, an axial dimension of the electric motor also increases.

An object of the present invention is to downsize a brush holder and an electric motor in which a holder main body and a connector portion are formed integrally.

An electric motor according to the present invention has a brush holder formed by a resinous material and integrally with: a holder main body disposed inside a pair of motor housings and retaining a pair of brushes slidably contacting with a commutator; a power-supply connector portion disposed outside the motor housings and connected detachably to an external connector; and a coupling portion provided so as to protrude outside the motor housings from the holder main body and coupling the holder main portion and the connector portion, the motor comprising: a first lead member formed by a metal plate with a conductive property and including: a main body portion embedded into the holder main body, the coupling portion, and the connector portion; a connector side terminal protruding from the connector portion; and a holder-main-body side terminal protruding from the holder main body and connected to one of the brushes; and a second lead member formed by a metal plate with a conductive property and including: a main body portion embedded into the holder main body, the coupling portion, and the connector portion alongside of the first lead member; a connector side terminal protruding from the connector portion; and a holder-main-body side terminal protruding from the holder main body and connected to the other of the brushes, wherein each of the connector side terminals of the first and second lead members is disposed so as to match its width direction with an axial direction of the commutator and to be mutually aligned in the width direction, each of the main body portions of the first and second lead members is twisted perpendicularly to the connector side terminal with reference to an axis at a base end of the connector portion, and disposed in the coupling portion so as to match its thickness direction with the axial direction of the commutator and to be mutually aligned in the width direction, and the brush holder is clamped and fixed to the pair of motor housings.

The electric motor according to the present invention is such that the connector portion is opened outside a radial direction of the commutator.

The electric motor according to the present invention is such that the connector portion is disposed so as to be shifted in the axial direction of the commutator with respect to the holder main body.

An opening/closing apparatus for vehicular opening/closing body according to the present invention automatically opens and closes an opening/closing body provided to a vehicle by power of an electric motor, the electric motor comprising: an armature; a motor yoke rotatably built in the armature; a reduction mechanism constituted by a worm formed integrally with a revolution shaft of the armature and by a worm wheel meshing with the worm; a gear case fixed to the motor yoke and built in the reduction mechanism; and an output shaft extending in a direction orthogonal to the revolution shaft at an axis of the worm wheel and protruding from the gear case; a brush holder formed by a resinous material and integrally with: a holder main body disposed inside the motor yoke and the gear case and retaining a pair of brushes slidably contacting with a commutator; a power-supply connector portion disposed outside the motor housing and connected detachably to an external connector; a coupling portion provided so as to protrude outside the motor yoke from the holder main body and coupling the holder main body and the connector portion; and the brush holder including: a first lead member formed by a metal plate with a conductive property, the first lead member having: a main body portion embedded into the holder main body, the coupling portion, and the connector portion; a connector side terminal protruding from the connector portion; and a holder-main-body side terminal protruding from the holder main body and connected to one of the brushes; and a second lead member formed by a metal plate with a conductive property, the second lead member having: a main body portion embedded into the holder main body, the coupling portion, and the connector portion alongside the first lead member; a connector side terminal protruding from the connector portion; and a holder-main-body side terminal protruding from the holder main body and connected to the other of the brushes, wherein each of the connector side terminals of the first and second lead members is disposed so as to match its width direction with an axial direction of the commutator and to be mutually aligned in the width direction, and each of the main body portions of the first and second lead members is twisted perpendicularly to the connector side terminal with reference to an axis at a base end of the connector portion, and disposed in the coupling portion so as to match its thickness direction with the axial direction of the commutator and to be mutually aligned in the width direction, wherein the electric motor is fixed inside a wall of the vehicle so that the axial direction of the output shaft is a thickness direction of the wall of the vehicle.

According to the present invention, by disposing each of the connector side terminals so as to match its width direction to the axial direction of the commutator and to be mutually aligned in the width direction and by twisting the main body portions perpendicularly to the connector side terminal with reference to their axes, each of the main body portions is disposed in the coupling portion so as to match its thickness direction with the axial direction of the commutator and to be mutually aligned in the width direction. Therefore, a thickness dimension of the connector portion is decreased, and an axial dimension of the electric motor is also decreased, whereby this electric motor can be downsized.

Also, according to the present invention, since the connector portion is opened outside the radial direction of the commutator, detachment workability of the external connector with respect to this connector portion can be enhanced.

Further, according to the present invention, since the axis of the connector portion is shifted in the axial direction of the commutator with respect to an axis of the coupling portion, the connector portion can be disposed without interfering with a frame and other members etc. fixed to the motor housing.

Also, because making the electric motor thin in the direction of its output shaft is achievable, layout characteristics is enhanced even when the electric motor is used, inside the wall of the vehicle, as the opening/closing apparatus for vehicular opening/closing body.

BEST MODE FOR CARRYING OUT THE INVENTION

Hereinafter, an embodiment of the present invention will be described in detail based on the drawings.

Figure 1A:
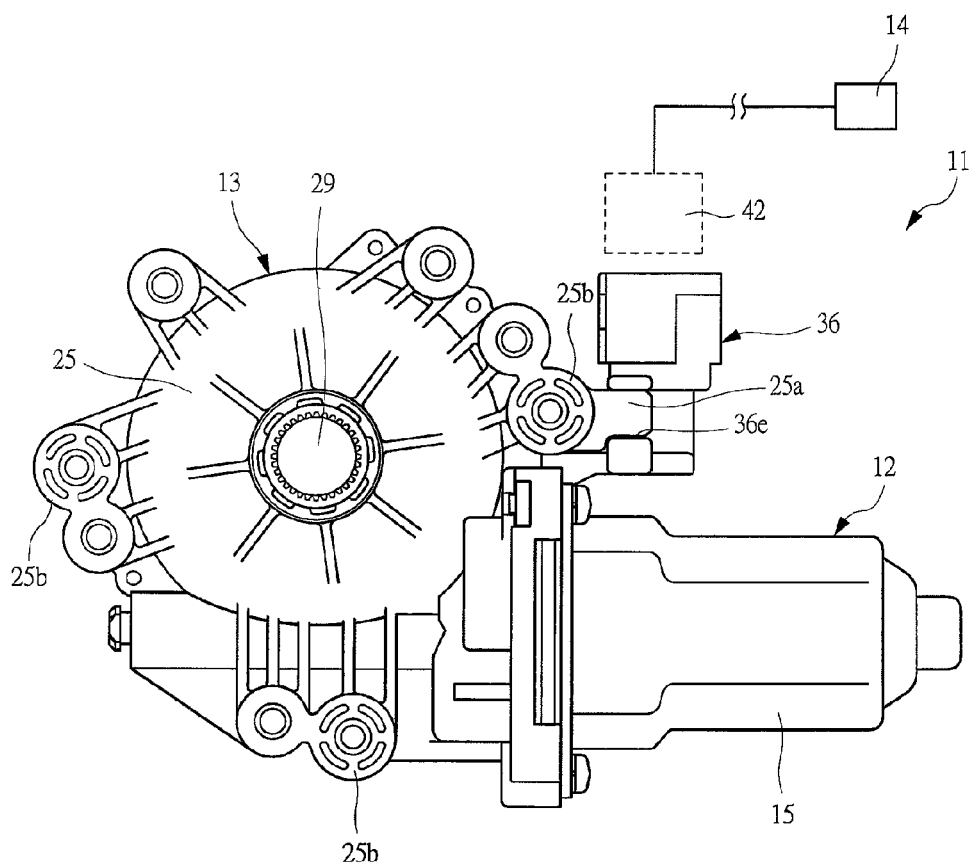
FIGS. 1A and 1B are a front view and a side view showing a power window motor equipped with a brush holder, which is an embodiment of the present invention.
Figure 1B:
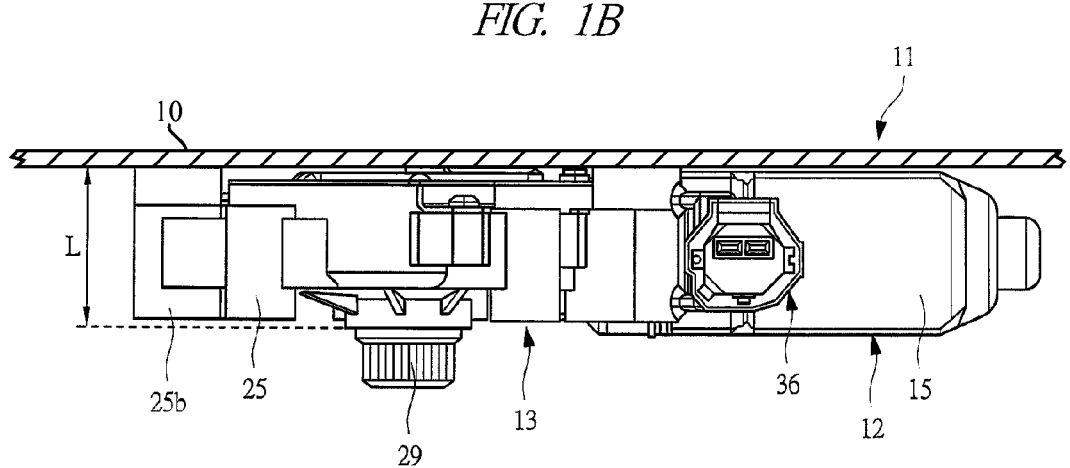

A power window motor 11 shown in FIGS. 1A and 1B is employed as a driving source of a power window apparatus provided in a vehicle (not shown), and is mounted inside a door of a vehicle body to drive a window glass for opening and closing via a regulator (not shown).

This power window motor 11 is equipped with a motor main body 12 and a reducer 13 and becomes an electric motor with reducer, in which those members are assembled as one unit, and its operation control is performed by a control unit 14 provided in the vehicle body.

Figure 2:
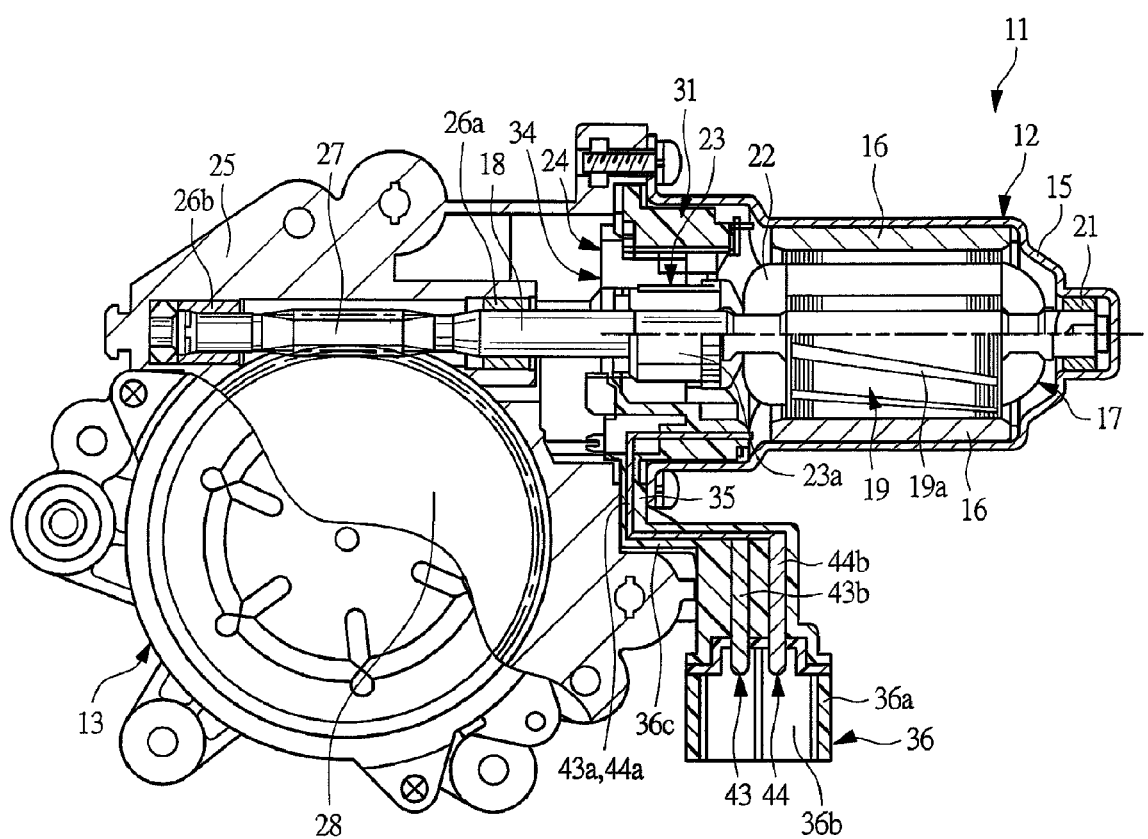
FIG. 2 is a sectional view of the power window motor shown in FIG. 1.

The motor main body 12 is a so-called electric motor with brushes, and, as shown in FIG. 2, this motor main body 12 has a motor yoke 15 serving as an oval-sectional bottomed-cylindrical motor housing, and a pair of magnets 16 is fixed on an inner periphery surface of the motor yoke 15. Inside the motor yoke 15, an armature 17 is accommodated so as to oppose these magnets 16. The armature 17 has an armature shaft (revolution shaft) 18, and an armature core 19 fixed to the armature shaft 18, and one end of the armature shaft 18 is supported by a bearing 21 provided at the bottom portion of the motor yoke 15, whereby the armature 17 is rotatable inside the motor yoke 15. A plurality of slits 19a are formed in the armature core 19, and a plurality of armature coils 22 are wound around these respective slits 19a so as to overap each other. Also, a commutator 23 is fixed to the armature shaft 18 adjacently to the armature core 19, and an end of each armature coil 22 is electrically connected to a corresponding segment 23a of the commutator 23.

On the motor main body 12, a power supply apparatus 24 is provided to supply power to the commutator 23. The power supply apparatus 24 has a pair of brushes (as detailed later) slidably contacting with an outer periphery surface of the commutator 23, and when a direct current is supplied to these brushes, this direct current is commutated by the commutator 23 to flow in each armature coil 22. When the direct current flows in the armature coils 22, an electromagnetic force is generated between the armature core 19 and the magnets 16, and the armature 17 revolves by this electromagnetic force. Incidentally, details of the power supply apparatus 24 will be described later.

On the other hand, the reducer 13 has a gear case 25 as a motor housing, and this gear case 25 is fixed to an opening end of the motor yoke 15 by fastening members (bolts), and blocks an opening portion of the motor yoke 15. The armature shaft 18 of the motor main body 12 protrudes inside the gear case 25 from an interior of the motor yoke 15, and its protrusive base end portion and its tip portion are supported rotatably at the gear case 25 by bearings 26a and 26b. A worm 27 is integrally formed on an outer periphery surface of a part of the armature shaft 18 protruding inside the gear case 25, a worm wheel 28 meshing with the worm 27 is accommodated rotatably inside the gear case 25, and an output shaft 29 is fixed to an axis of the worm wheel 28 so as to extend in a direction orthogonal to the armature shaft 18. Also, a tip portion of the output shaft 29 protrudes from the gear case 25, and this tip portion protruding from the gear case 25 is coupled to a regulator (not shown). Thereby, when the motor main body 12 actuates and the armature shaft 18 revolves, this revolution is reduced to predetermined revolution by a reduction mechanism constituted by the worm 27 and the worm wheel 28 and is transmitted to the output shaft 29, and the window glass is driven for opening/closing by the revolution of the output shaft 29 via the regulator. Also, a pair of engagement projections 25a is formed integrally with the gear case 25 so as to be able to be engaged with engagement concaves 36d and 36e provided to a brush holder 31 (as described later).

Incidentally, the output shaft 29 supported by the gear case 25 is disposed so as to align its axial direction with a direction in which a thickness dimension of the oval-sectional motor yoke 15 is small. Thereby, this power window motor 11 is formed, as shown in FIG. 1B, into such a flat shape that a thickness dimension "L" in the axial direction of the output shaft 29 is small. Also, the gear case 25 is provided integrally with a plurality of attachment legs 25b. Then, the power window motor 11 is disposed inside a door so as to direct the axial direction of the output shaft 29 to inner and outer directions of the door, i.e., a thickness direction of the door, the door constituting a part of a thinly formed vehicular wall, and is fixed inside the door so that each surface of a plurality of attaching leg portions 25b located opposite a protruding direction of the output shaft 29 is fixed to an inner panel of the door 10 by fastening means such as bolts.

Figure 3A:
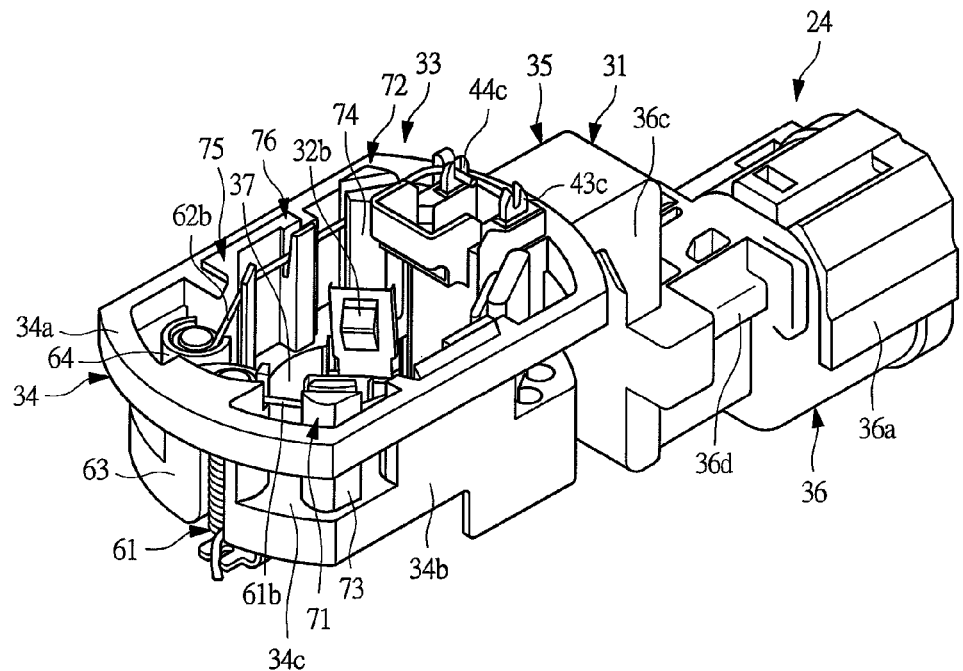
FIGS. 3A and 3B each are a perspective view showing a detail of a power supply apparatus shown in FIG. 2.
Figure 3B:
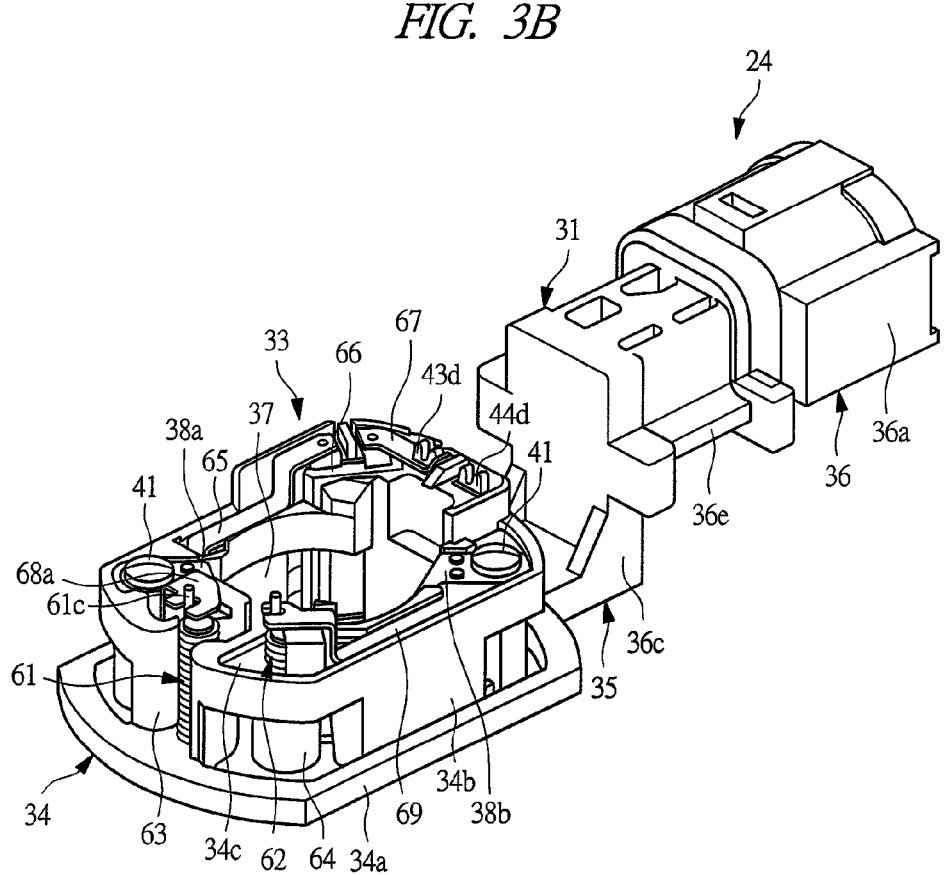
Figure 4A:
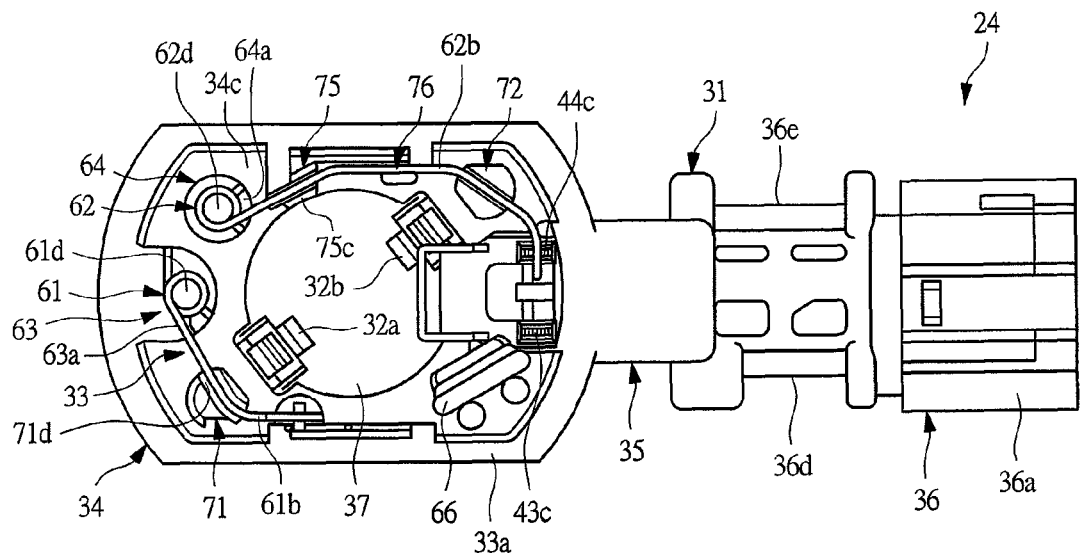
FIG. 4A is a plan view of the power supply apparatus shown in FIG. 2.

FIGS. 3A and 3B each are a perspective view showing a detail of a power supply apparatus shown in FIG. 2; FIG. 4A is a plan view of the power supply apparatus shown in FIG. 2; and FIG. 4B is a back view of the power supply apparatus shown in FIG. 2.

As shown in FIGS. 3 and 4, this power supply apparatus 24 provided to the power window motor 11 is equipped with a resin-made brush holder 31, and the power supply apparatus 24 is constituted by providing the aforementioned brushes 32a and 32b and a power supply circuit 33 to the brush holder 31.

The brush holder 31 is resin-made and formed by injection molding of a resinous material, and has a structure in which a holder main body 34, a coupling portion 35, and a connector portion 36 are formed integrally. The holder main body 34 has a ring portion 34a formed into an outer shape of a substantially oval along an opening end of the motor yoke 15, a pair of side walls 34b extending from the ring portion 34a to an axial direction of the armature shaft 18, and a base wall 34c formed at an opposite end portion of each side wall 34b opposite to the ring portion 34a in the axial direction of the armature shaft 18, i.e., a director orthogonal to an axial direction of the commutator 23. The ring portion 34a and the coupling portion 35 are disposed inside the motor yoke 15, i.e., inside the motor main body 12 in a state of being sandwiched by the motor yoke 15 and the gear case 25 to be fixed inside the motor main body 12. Also, a penetrating hole 37 is formed in an axial portion of the base wall 34c, and the commutator 23 is inserted into this penetrating hole 37 and disposed inside the holder main body 34.

Figure 4B:
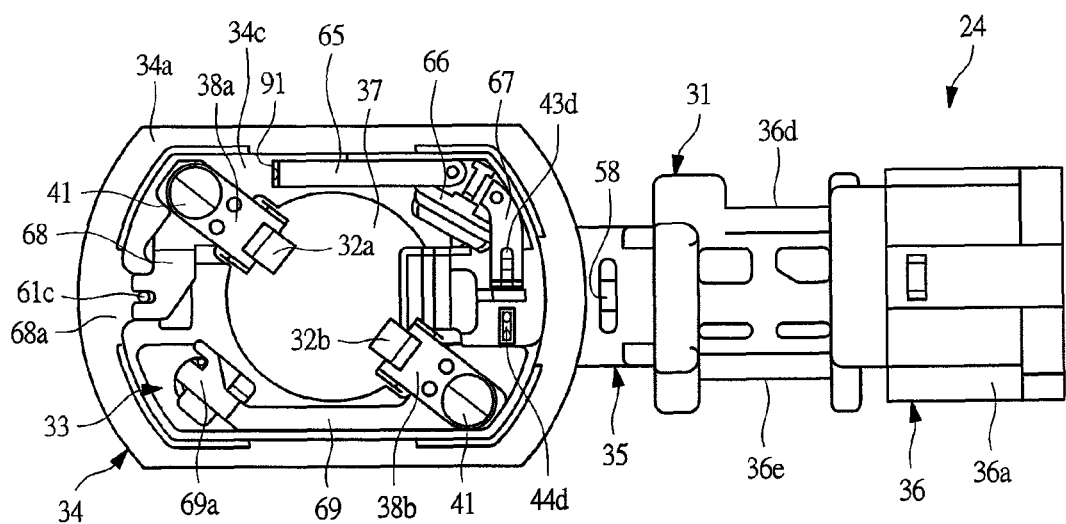
FIG. 4B is a back view of the power supply apparatus shown in FIG. 2.

As shown in FIGS. 3B and 4B, base ends of a pair of leaf springs 38a and 38b are fixed to the base wall 34c by screw members 41, and the aforementioned brushes 32a and 32b are respectively attached to the tips of these leaf springs 38a and 38b. These brushes 32a and 32b slidably contact with the outer periphery surface of the commutator 23 in an elastically biased condition, i.e., the respective brushes 32a and 32b are retained by the holder main body 34, and slidably contact with the outer periphery surface of the commutator 23.

The coupling portion 35 is formed so as to extend outward in a radial direction of the commutator 23 from the ring portion 34a of the holder main body 34, and, as shown in FIG. 2, protrudes outside the motor yoke 15 from between the motor yoke 15 and the gear case 25, and its tip portion is connected to the connector portion 36. In other words, the coupling portion 35 couples, inside and outside the motor main body 12, the holder 34 disposed inside the motor main body 12 and the connector portion 36 disposed outside the motor main body 12.

Figure 5A:
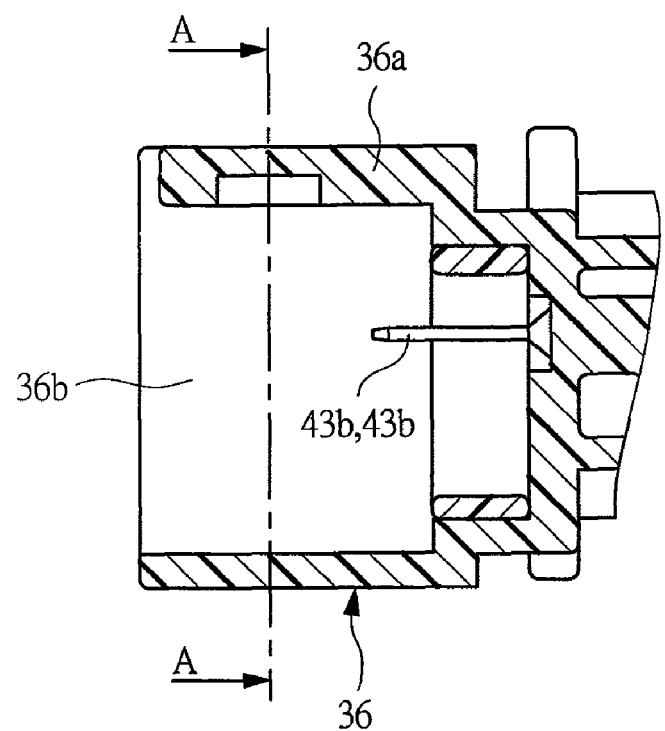
FIG. 5A is a sectional view showing an internal structure of a connector portion.
Figure 5B:
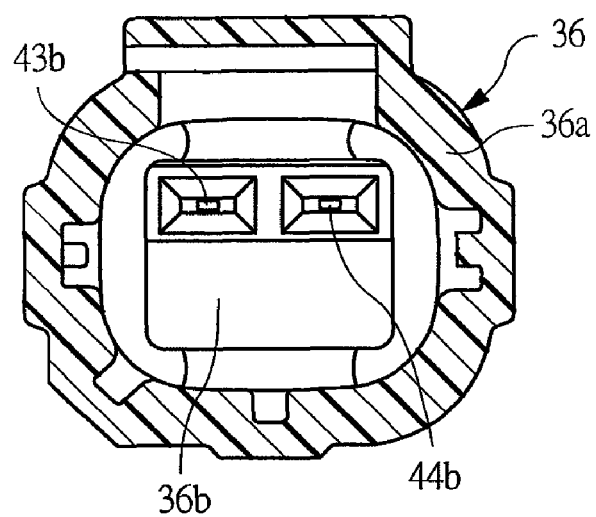
FIG. 5B is a sectional view taken along Line A-A in FIG. 5A.

FIG. 5A is a sectional view showing an inner structure of the connector portion, and FIG. 5B is a sectional view taken along Line A-A in FIG. 5A.

As shown in FIG. 1, the connector portion 36 is disposed outside and adjacently to the motor yoke 15, and this connector portion 36 is connected to an external connector 42 from the control unit 14, and serves as power feed for supplying power from the control unit 14 to the respective brushes 32a and 32b. As shown in FIG. 5, the connector portion 36 is formed into a quadrate-section box shape whose one end is opened, connection concave portion 36b is formed inside its outer periphery wall 36a, and this connection concave portion 36b is opened outside a radial direction of the commutator 23 and toward the worm wheel 28 side when being viewed from the armature shaft 18. In contrast, the external connector 42 from the control unit 14 is formed convexly, and, as shown in FIG. 1, the external connector 42 is connected to the connector portion 36 in a state of being accommodated in this connection concave portion 36b by being pressed axially into the connection concave portion 36b. Also, by pulling the external connector 42 in a state in which a release button (not shown) provided to the external connector 42 is operated, the external connector 42 can be removed from the connector portion 36. In other words, the connector portion 36 is connected detachably to the external connector 42.

The base end of the connector portion 36 is provided with a coupling piece 36c extending to the gear case 25 side in parallel to the axial direction of the commutator 23, and this coupling piece 36c of the connector portion 36 is connected to a tip of the coupling portion 35. Therefore, the connector portion 36 is disposed so as to be shifted toward the bottom portion side of the motor yoke 15 with respect to the holder main body 34, whereby interference with the gear case 25 is prevented.

Also, a pair of engagement concave portions 36d and 36e is provided between the outer periphery wall 36a and the coupling piece 36c of the connector portion 36, thereby making it possible to be engaged with the engagement projection 25a of the gear case 25. Therefore, a load generated in attaching and detaching the external connector 42 to and from the connector portion 36 can be effectively absorbed by the gear case 25.

Figure 6:
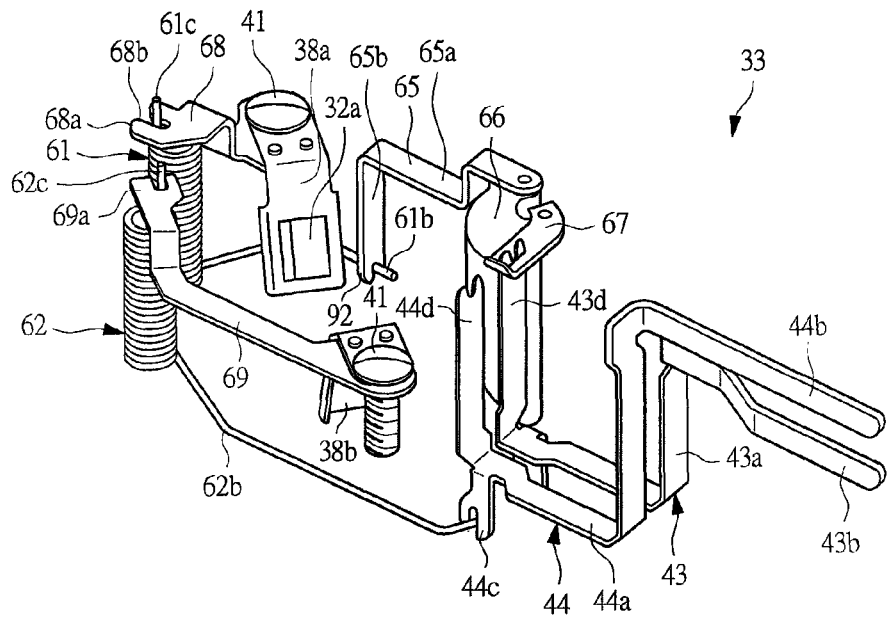
FIG. 6 is a perspective view showing an overall structure of a power supply circuit.
Figure 7:
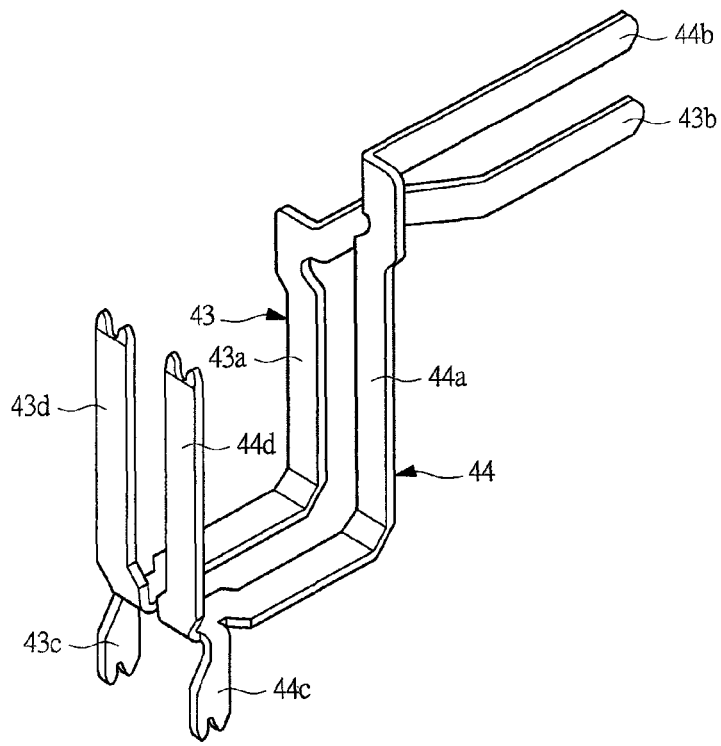
FIG. 7 is a perspective view showing details of first and second lead plates shown in FIG. 6.

FIG. 6 is a perspective view showing an overall structure of a power supply circuit, and FIG. 7 is a perspective view showing details of first and second lead plates shown in FIG. 6.

The power supply circuit 33 is a circuit for connecting the external connector 42 connected to the connector portion 36 and the respective brushes 32a and 32b to supply power from the external connector 42 to the brushes 32a and 32b. As shown in FIG. 6, this power supply circuit 33 is provided with a first lead plate 43 as a first lead member and a second lead plate 44 as a second lead member in order to electrically connect a connector portion side and a holder main body side.

As shown in FIG. 7, the first lead plate 43 is formed by piercing a metal plate with a conductive property such as a steel plate or copper plate into a predetermined shape and by bending it into a predetermined shape, and has a main body portion 43a whose middle portion is bent into an L-shape; a connector side terminal 43b extending from one end of the main body portion 43a; a front-side power supply terminal 43c as a one-side terminal extending from the other end of the main body portion 43a to one axial-directional side of the commutator 23; and a back-side power supply terminal 43d as the other-side terminal extending from the other end of the main body portion 43a to the other axial-directional side of the commutator 23. Similarly, the second lead member 44 is formed by piercing a metal plate with a conductive property such as a steel plate or copper plate into a predetermined shape and by bending it to a predetermined shape, and has a main body portion 44a whose middle portion is bent into an L-shape; a connector side terminal 44b extending from one end of the main body portion 44a; a front-side power supply terminal 44c as a one-side terminal extending from the other end of the main body portion 44a to one axial-directional side of the commutator 23, and a back-side power supply terminal 44d as the other-side terminal extending from the other end of the main body portion 44a to the other axial-directional side of the commutator 23.

These lead plates 43 and 44 are embedded by aligning the respective main body portions 43a and 44a with each other and by insert-molding the brush holder 31 through the holder main body 34, the coupling portion 35, and the connector portion 36 in the corresponding main body portions 43a and 44a. Also, as shown in FIGS. 2 and 5, connector side terminals 43b and 44b of the lead plates 43 and 44 protrude inside the connection concave portion 36b from the connecter portion 36 so that their width directions are matched with the axial direction of the commutator 23, and that their thickness directions are matched with the axial direction of the output shaft 29, whereby their protruding portions form terminal portions. Also, the connector side terminal 43b of the first lead plate 43 is bent at its middle portion so as to extend along the second lead plate 44, whereby the connector side terminals 43b and 44b protruding in the connector portion 36 are aligned mutually in their width directions. Therefore, for example, thickness dimensions of the respective connecter side terminals 43b and 44b, which are directed toward the output shaft 29 of the connector portion 36 accommodating the connecter side terminals 43b and 44b, can be reduced as compared with the case where their thickness directions are matched with the axial direction of the commutator 23, and where the connecter side terminals 43b and 44b are disposed alongside of their width directions.

On the other hand, the main body portions 43a and 44a of the first and second lead plates 43 and 44 are respectively twisted perpendicularly to the connector side terminals 43b and 44b with reference to their axes in a base end of the connector portion 36, and, as can be understood from FIG. 2, match their width directions with the axial direction of the output shaft 29 and are aligned with each other in their width directions, and are disposed so that their thickness directions are matched with the axial direction of the commutator 23. Thereby, a dimension of the coupling portion 35 directed to the axial direction of the commutator 23 is reduced, whereby the coupling portion 35 can be formed thin. In other words, even when the connector side terminals 43b and 44b of the lead plates 43 and 44 formed into plate-shapes are disposed so as to match their width directions with the axial direction of the commutator 23 and match their thickness directions with the axial direction of the output shaft 29, the width directions of the respective main body portions 43a and 44a at the coupling portion 35 are matched with the axial direction of the commutator 35 by twisting the main body portions 43a and 44a perpendicularly to the connector side terminals 43b and 44*b* with reference to their axes, whereby the thickness of the commutator 23 in the coupling portion 35 can be formed small.

As described above, in this brush holder 31, the respective connector side terminals 43*b* and 44*b* are disposed so as to match their width directions with the axial direction of the commutator 23 and be aligned with each other in their width directions, and the main body portions 43*a* and 44*a* are twisted perpendicularly to the connector side terminals 43*b* and 44*b* with reference to their axes, so that these main body portions 43*a* and 44*a* are disposed in the coupling portion 35 so as to match their thickness directions with the axial direction of the commutator 23 and be aligned with each other in their width directions and to match their thickness directions with the axial direction of the output shaft 29, whereby this power window motor 11 can be downsized by reducing the thickness dimension of the connector portion 36 and by reducing an axial dimension of the power window motor 11 to which this brush holder is provided.

Also, in this brush holder 31, because the connector portion 36 is opened outside the radial direction of the commutator 23, detachment/attachment workability of the external connector 42 with respect to the connector portion 36 in this power window motor 11 can be enhanced.

Furthermore, in this brush holder 31, because the axis of the connector portion 36 is shifted in the axial direction of the commutator 23 with respect to the axis of the coupling portion 35, the connector portion 36 can be disposed without interfering with the gear case 25 fixed to the motor yoke 15 and with other members.

Also, since this power window motor 11 has a structure in which the engagement concave portions 36*d* and 36*e* of the connector portion 36 in the brush holder 31 and the engagement projection 25*a* of the gear case 25 are engaged with each other, a load generated in attaching and detaching the external connector 42 to and from the connector portion 36 can be effectively absorbed by the gear case 25.

As shown in FIGS. 3A and 4A, the front-side power supply terminals 43*c* and 44*c* of the lead plates 43 and 44 each protrude alongside of one axial-directional side of the commutator 23, i.e., a front side of the brush holder 31 with respect to the base wall 34*c* of the holder main body 34, whereby respective protruding portions function as terminals to connect the connector side terminals 43*b* and 44*b* to a circuit provided on the front side of the brush holder 31. Also, the back-side power supply terminals 43*d* and 44*d* of the lead plates 43 and 44 each protrude alongside of the other axial-directional side of the commutator 23, i.e., a back side of the brush holder 31 with respect to the base wall 34*c* of the holder main body 34, whereby respective protruding portions function as terminals to connect the connector side terminals 43*b* and 44*b* to a circuit provided on the back side of the brush holder 31. In other words, the first and second lead plates 43 and 44 are connected to the corresponding brushes 32*a* and 32*b* to either one of the front-side power supply terminals 43*c* and 44*c* or the back-side power supply terminals 43*d* and 44*d* serving as holder-main-body side terminals.

Figure 8:
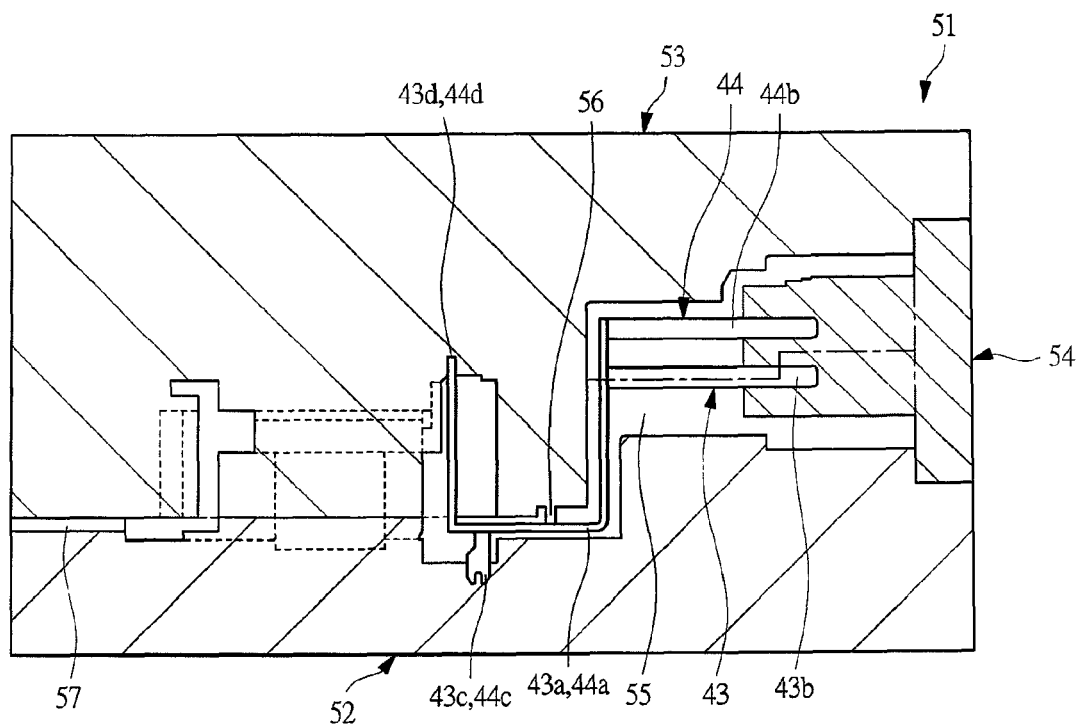
FIG. 8 is a sectional view showing a molding apparatus of the brush holder.
Figure 9:
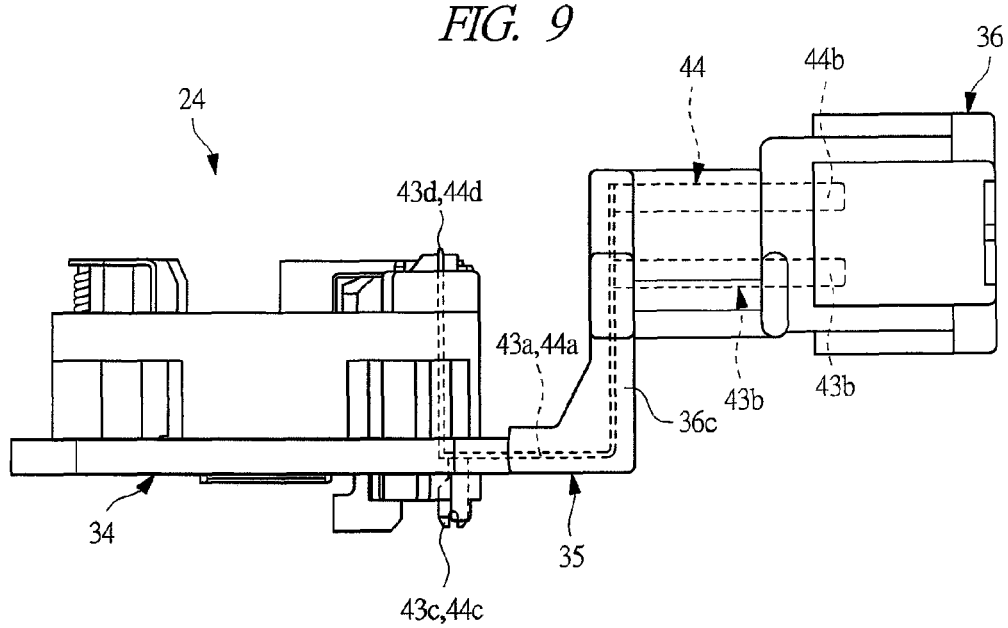
FIG. 9 is a side view showing a disposition condition of each lead plate inside the brush holder.
Figure 10:
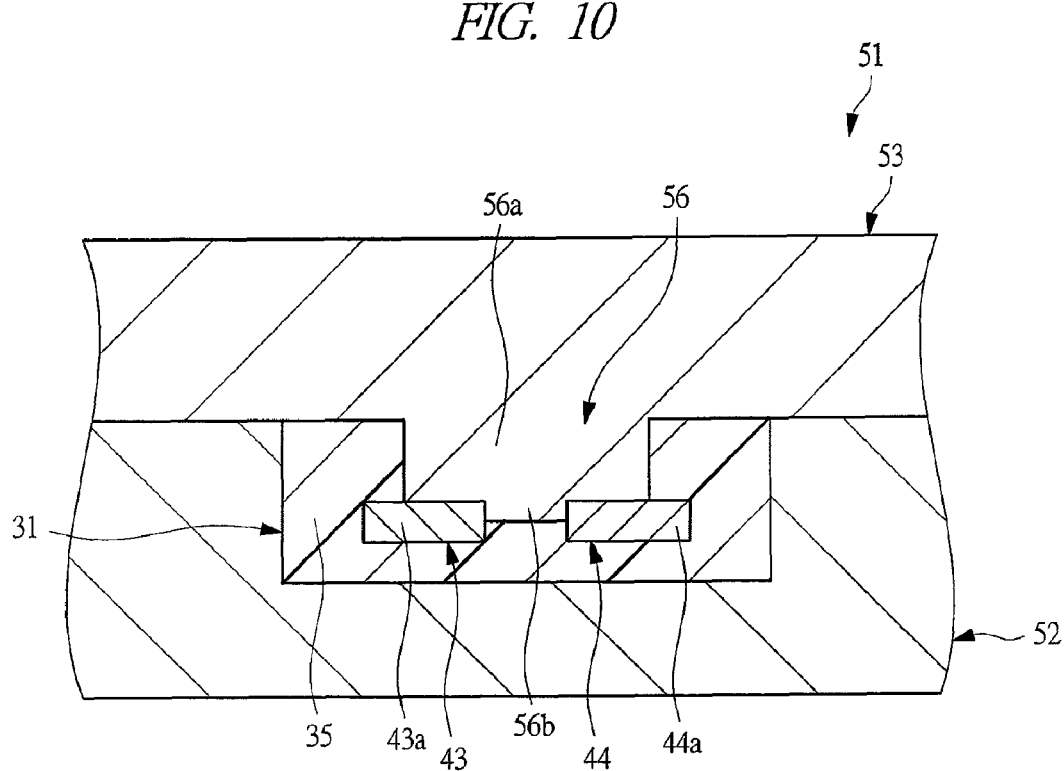
FIG. 10 is a sectional view showing a detail of a retaining portion provided to a second mold.
Figure 11:
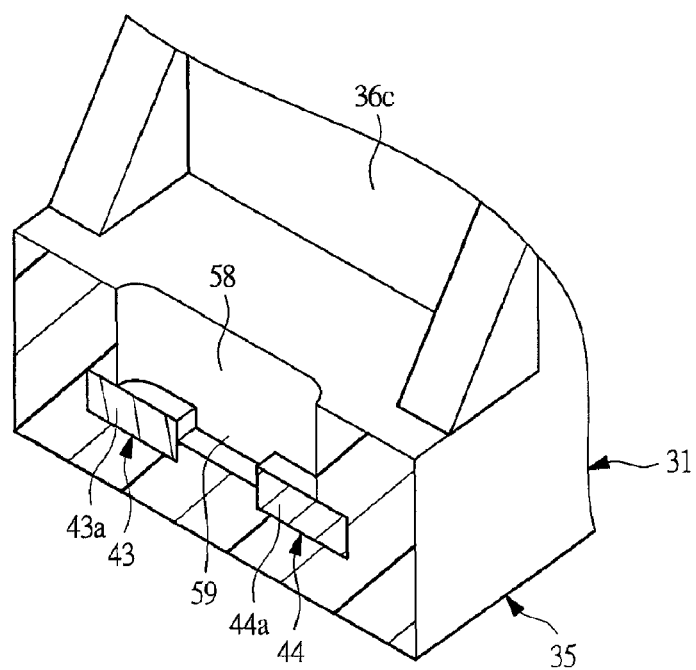
FIG. 11 is a sectional view showing a detail of an exposure hole formed in a coupling portion by the retaining portion shown in FIG. 10.

FIG. 8 is a sectional view showing a molding apparatus of the brush holder, and FIG. 9 is a side view showing a disposition condition of each lead plate inside the brush holder. Also, FIG. 10 is a sectional view showing a detail of a retaining portion provided to a second mold, and FIG. 11 is a sectional view showing a detail of an exposure hole formed at the coupling portion by the retaining portion illustrated in FIG. 10. Next, a manufacturing method of the brush holder 31, into which the respective lead plates 43 and 44 are embedded, will be described based on FIGS. 8 to 11.

This molding apparatus 51 of the brush holder 31 is equipped with a first mold 52 and a second mold 53, and the second mold 53 is relatively movable in closing and separating directions along the axial direction of the commutator 23 with respect to the first mold 52. Also, the molding apparatus 51 is provided with a sliding mold 54 for forming the connection concave portion 36*b* in the connector portion 36, and this sliding mold 54 is movable in a direction orthogonal to relatively moving directions of the first and second molds 52 and 53, and when the first mold 52, the second mold 53, and the sliding mold 54 are combined, a molding chamber 55 is formed between the molds 52, 53, and 54.

In the first mold 52, a pair of retention holes (not shown in details) is provided alongside, and the front-side power supply terminals 43*c* and 44*c* of the lead plates 43 and 44 are inserted into their corresponding retention holes at their tip portions, thereby being retained in the first mold 52. Similarly, in the second mold 53, a pair of retention holes (not shown in details) is provided alongside, and the back-side power supply terminals 43*d* and 44*d* of the lead plates 43 and 44 are inserted into their corresponding retention holes at their tip portions, thereby being retained in the second mold 53. Similarly, in the sliding mold 54, a pair of retention holes (not shown in details) is provided alongside, and the connector side terminals 43*b* and 44*b* of the lead plates 43 and 44 are inserted into their corresponding retention holes at their tip portions, thereby being retained in the sliding mold 54. Thereby, as shown in FIG. 8, in the first and second lead plates 43, 44, their respective front-side power supply terminals 43*c* and 44*c* are retained at their tip portions by the first mold 52, their respective back-side power supply terminals 43*d* and 44*d* are retained at their tip portions by the second mold 53, and in a state in which their respective connector side terminals 43*b* and 44*b* are retained at their tip portions by the sliding mold 54, they are disposed alongside of each other inside the molding chamber 55.

Also, in the second mold 53 of this molding apparatus 51, the main body portions 43*a* and 44*a* of the respective lead plates 43 and 44 embedded into the coupling portion 35, i.e., respective middle portions of the terminals retained in the respective molds 52 to 54 are provided with a retaining portion 56 for retaining the respective lead plates 43 and 44 to be disposed in the molding chamber 55. This retaining portion 56 has a first projection piece 56*a* protruding from a main body of the second mold 53 to a side of the first mold 52 and contacting with one of outer surfaces located in the thickness directions of the lead plates 43 and 44; and a second projection piece 56*b* further protruding from the first projection piece 56*a* to the side of the first mold 52 and disposed between the first lead plate 43 and the second lead plate 44. Axial motions of the first lead plate 43 and the second lead plate 44 are restricted by the first projection piece 56*a*, and an interval between them is maintained by sandwiching the second projection piece 56*b* therebetween.

After the first lead plate 43 and the second lead plate 44 are disposed in the molding chamber 55, a molten resinous material is injected into the molding chamber 55 from an injection hole 57 that is provided to the first mold 52 side in matching surfaces of the first mold 52 and the second mold 53. When the molten resinous material is injected from the injection hole 57 into the molding chamber 55, an interior of the molding chamber 55 is filled with the resinous material, and by this resinous material, the brush holder 31 is insert-molded integrally with the holder main body 34, the coupling portion 35, and the connector portion 36. At this time, the sliding mold 54 protrudes into a portion where the molding chamber 55 in the connector portion 36 is molded, and by this sliding mold 54, the connection concave portion 36b is formed inside the connector portion 36. Also, the retention holes provided in each of molds 52 to 54 are made so as not to be intruded by the resinous material, whereby the tip portions of the first and second lead plates 43 and 44 retained in the retaining holes form terminals since the portions retained in the retaining holes protrude from the holder main body 34 and the connector portion 36. Also, since the brush holder 31 is shaped in a state in which the main body portions 43a and 44a are retained by the retaining portion 56, as shown in FIG. 11, an exposure hole 58 that exposes parts of the main body portions 43a and 44a of the respective lead plates 43 and 44 to the outside is formed in the coupling portion 35 of the shaped brush holder 31, and a gap 59 is formed between the main body portions 43a and 44a of the respective lead plates 43 and 44 exposed from this exposure hole 58.

As described above, in this brush holder 31, because the insert molding of the brush holder 31 is performed in a state in which the lead plates 43 and 44 are retained in the molding chamber 55 at three locations of the connector side terminals 43b and 44b, the front-side power supply terminals 43c and 44c, and the back-side power supply terminals 43d and 44d, dislocation and deformation generated in inject-molding the respective lead plates 43 and 44 embedded in the brush holder 31 can be suppressed. Therefore, the respective lead plates 43 and 44 are prevented from contacting with each other inside the brush holder 31, whereby insulation failure can be prevented from occurring between them. Also, because the insulation failure of the lead plates 43 and 44 can be prevented in a step of insert-molding the brush holder 31, another step of preventing the insulation failure of the respective lead plates 43 and 44 becomes unnecessary and the number of processing steps is recued, whereby cost of this brush holder 31 can be reduced.

Also, in this brush holder 31, the retaining portion 56 for retaining the main body portions 43a and 44a of the respective lead plates 43 and 44 is provided in addition to the three locations of the connector side terminals 43b and 44b, the front-side power supply terminals 43c and 44c, and the back-side power supply terminals 43d and 44d, so that the middle portion of each of the terminals is retained in the molding chamber 55 by the retaining portion 56, whereby the insulation failure of the respective lead plates 43 and 44 in the injection molding can be prevented further certainly.

Incidentally, in this power window motor 11, in order to further ensure insulation properties of the respective lead plates 43 and 44, the exposure hole 58 formed in the coupling portion 35 after shaping the brush holder 31 is blocked by a seal material et al. Furthermore, the present embodiment may have a structure in which a portion retaining the main body portions 43a and 44a of the respective lead plates 43 and 44 in shaping the brush holder 31 is set at a position of being clamped by the motor housing.

Figure 12:
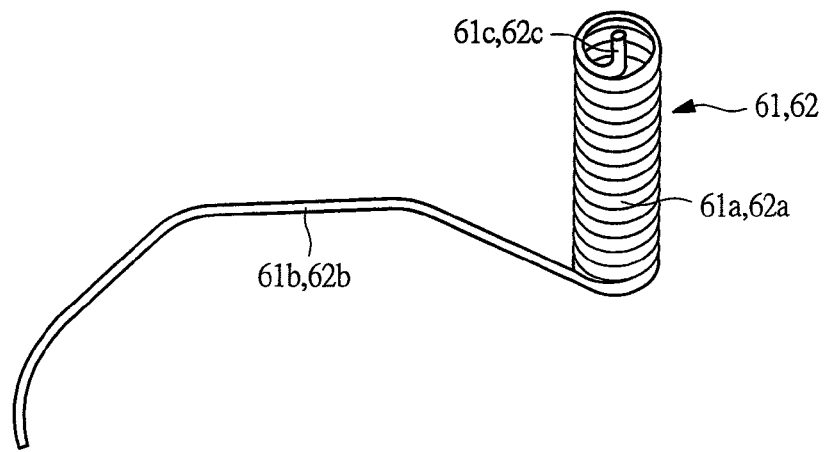
FIG. 12 is a perspective view showing a detail of a choke coil.
Figure 13:
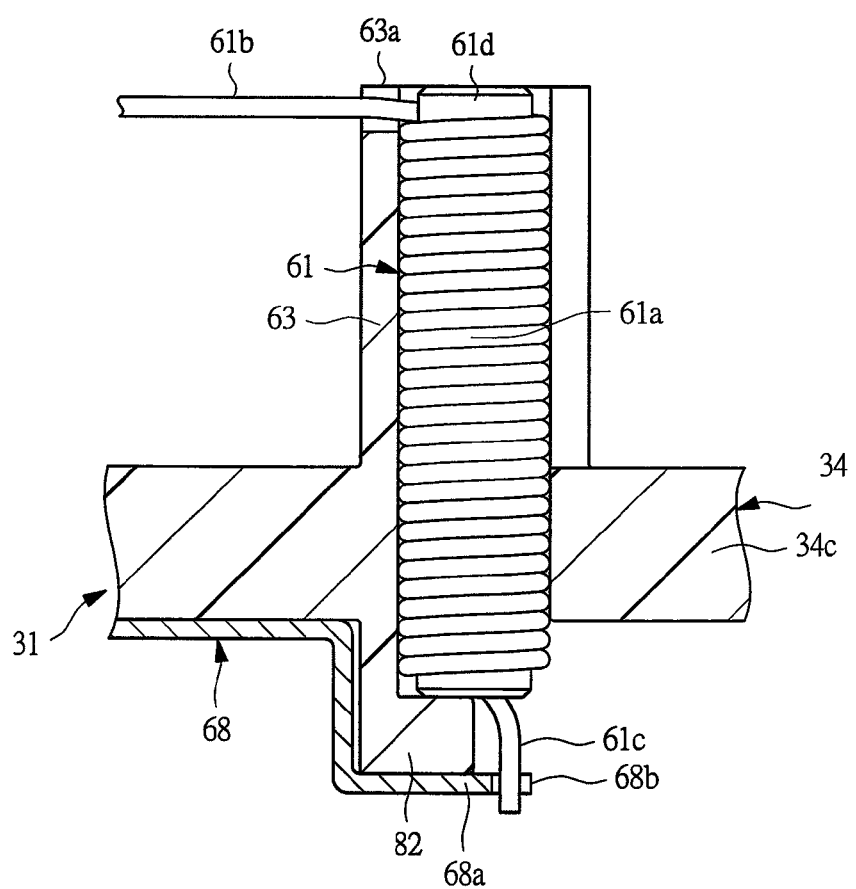
FIG. 13 is a sectional view showing a detail of one of element mounting portions.

FIG. 12 is a perspective view showing a detail of a choke coil, and FIG. 13 is a sectional view showing a detail of one of the element mounting portions.

In order to absorb noise generated by sliding contact between each of the brushes 32a and 32b and the commutator 23, a pair of choke coils 61 and 62 as noise prevention elements is provided to the power supply circuit 33. As shown in FIG. 12, these choke coils 61 and 62 are respectively equipped with coil main bodies 61a and 62a in which lead wires are wound outside cylindrical iron core members 61d and 62d, and first connection lines 61b and 62b are extracted from one axial-directional ends of the coil main bodies 61a and 62a in tangential directions of coil main bodies 61a and 62a while second connection lines 61c and 62c are extracted from the other axial-directional ends thereof in the axial directions of the coil main bodies 61a and 62a, respectively.

As shown in FIGS. 3 and 4, a pair of element mounting portions 63 and 64 is provided to the brush holder 31 in order to mount these choke coils 61 and 62 to the brush holder 31. The one element mounting portion 63 is disposed at a position symmetrical about the axis of the holder main body 34 with respect to the coupling portion 35, and is formed integrally with the holder main body 34 so as to have a semi-cylindrical shape penetrating through the base wall 34c in the axial direction of the commutator 23. Also, the other element mounting portion 64 is disposed adjacently to the one element mounting portion 63, and is formed integrally with the holder main body 34 so as to have a cylindrical shape penetrating through the base wall 34c in the axial direction of the commutator 23.

In the one element mounting portion 63, the choke coil 61 is inserted axially from an insertion-side end portion which is a front side of the brush holder 31, whereby the choke coil is mounted in the element mounting portion 63 in parallel to the axial direction of the commutator 23. At this time, the choke coil 61 is inserted into the element mounting portion 63 from the other axial-directional end side, i.e., from a side where the second connection line 61c protrudes. Thereby, as shown in FIG. 13, the first connection line 61b of the choke coil 61 mounted on the element mounting portion 63 is extracted to the front side of the brush holder 31 from an extraction portion 63a formed in the insertion-side end portion of this element mounting portion 63, and the second connection line 61c is extracted to a back side of the brush holder 31 from the element mounting portion 63. Similarly, the choke coil 62 is inserted axially into the other element mounting portion 64 from an insertion-side end portion which is a front side of the brush holder 31, whereby the choke coil 62 is mounted on the element mounting portion 64 in parallel to the axial direction of the commutator 23. At this time, the choke coil 62 is inserted into the element mounting portion 64 from the other axial-directional end side, i.e., from a side where the second connection line 62c protrudes. Thereby, the first connection line 62b of the choke coil 62 mounted on the element mounting portion 64 is extracted to the front side of the brush holder 31 from an extraction portion 64a formed in the insertion-side end portion of this element mounting portion 64, and the second connection line 62c is extracted to the back side of the brush holder 31 from the element mounting portion 64.

As shown in FIG. 6, the first connection line 61b of the choke coil 61 mounted on the one element mounting portion 63 is connected to one end of a lead plate 65 which penetrates from a back of the base wall 34c to a front thereof, and the other end of this lead plate 65 is connected to a back-side power supply terminal 43d of the first lead plate 43 via a circuit breaker 66 and a lead plate 67. Also, the second connection wire 61c of the choke coil 61 is connected to one end of a lead plate 68 disposed on a back surface of the base wall 34c, and the other end of this lead plate 68 is fixed to the holder main body 34 together with a leaf spring 38a of the one brush 32a by a screw member 41. In other words, the choke coil 61 is connected between the back-side power supply terminal 43d and the one brush 32a via the lead plates 65, 67, and 68, the circuit breaker 66, and the leaf spring 38a. On the other hand, the first connection line 62b of the choke coil 62 mounted on the other element mounting portion 64 is connected to a front-side power supply terminal 44c of the second lead plate 44, the second connection line 62c is connected to one end of a lead plate 69 disposed on a back surface of the base wall 34c, and the other end of this lead plate 69 is fixed to the holder main body 34 together with a leaf spring 38b of the other brush 32*b* by the screw member 41. In other words, the choke coil 62 is connected between the front-side power supply terminal 44*c* of the second lead plate 44 and the other brush 32*b* via the lead plate 69 and the leaf spring 38*b*. As described above, when the power supply circuit 33 is constituted in the brush holder 31 and power is supplied to the respective connector terminals 43*b* and 44*b* from the control unit 14 via the external connector 42, the power is supplied to the respective brushes 32*a* and 32*b* via this power supply circuit 33, whereby the power window motor 11 actuates. Also, since a flowing direction of the current supplied from the control unit 14 is changed, positivity and negativity of each of the brushes 32*a* and 32*b* are reversed, and the power window motor 11 can be actuated in both forward and backward directions.

Incidentally, the lead plates 65, 67, 68, and 69 are formed by metal plates with conductive properties such as steel plates or copper plates.

As shown in FIGS. 3A and 4A, the brush holder 31 is provided with a first guiding portion 71 in order to dispose and retain the first connection line 61*b* of the choke coil 61 mounted on the one element mounting portion 63 at a predetermined position of the brush holder 31. Also, the brush holder 31 is provided with a second guiding portion 72 in order to dispose and retain the first connection line 62*b* of the choke coil 62 mounted on the other element mounting portion 64 at a predetermined position of the brush holder 31.

On the base wall 34*c* of the brush holder 31, a pair of cylindrical pillar portions 73 and 74 is provided integrally with this base wall 34*c* so as to protrude in the axial direction of the commutator 23 from the base wall 34*c* and toward the front side of the brush holder 31, the one cylindrical pillar portion 73 is disposed adjacently to the one element mounting portion 63, and the first guiding portion 71 is provided at a tip of this cylindrical pillar portion 73. Also, the other cylindrical pillar portion 74 is disposed adjacently to the front-side power supply terminal 43*c* of the first lead plate 43, and the second guiding portion 72 is provided at a tip of this cylindrical pillar portion 74.

Because the first guiding portion 71 and the second guiding portion 72 basically have the same structure, a description will be below made of the structures of these guiding portions 71 and 72 based on the first guiding portion 71.

Figure 14:
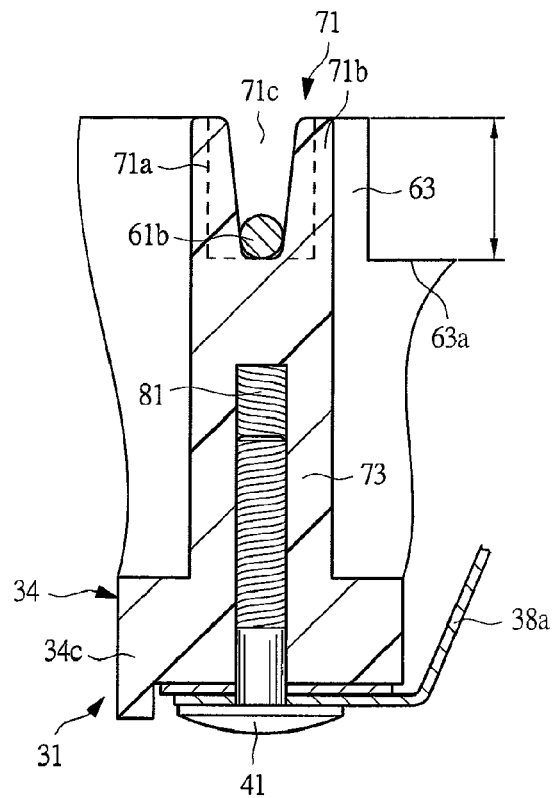
FIG. 14 is a sectional view showing a detail of a first guiding portion.

FIG. 14 is a sectional view showing a detail of the first guiding portion, and, as shown in this Figure, the first guiding portion 71 has a pair of guiding walls 71*a* and 71*b*, and a groove portion 71*c* formed between these guiding walls 71*a* and 71*b*. Inner surfaces of the guiding walls 71*a* and 71*b* are inclined in a direction of being gradually separate from each other toward an axial-directional tip side of this cylindrical pillar portion 73, whereby the groove portion 71*c* is formed so as to have a substantially V cross-section whose opening side is wider. Also, opening-side end portions of the respective guiding walls 71*a* and 71*b*, i.e., axial-directional tip portions are formed higher on an insertion-directional side of the choke coil 61 than the extraction portion 63*a* provided in the insertion-side end portion of the one element mounting portion 63. Furthermore, the groove portion 71*c* is formed in a schematically gradual curve along an outline of the ring portion 34*a* of the brush holder 31. And, the first connection line 61*b* of the choke coil 61 mounted on the one element mounting portion 63 is extracted from the extraction portion 63*a* and wired into the groove portion 71*c* of the first guiding portion 71, thereby being retained inside the groove portion 71*c* by the pair of guiding walls 71*a* and 71*b*. Similarly, the first connection line 62*b* of the choke coil 62 mounted on the other element mounting portion 64 is extracted from the extraction portion 64*a* and wired into a groove portion 72*c* of the second guiding portion 72, thereby being retained inside the groove portion 72*c* by the pair of guiding walls 72*a* and 72*b*. Also, as shown in FIG. 4, an end portion of the guiding wall 71*b* located on the element mounting portion 63 side in the first guiding portion 71 is provided with a corner portion 71*d* on which the first connection line 61*b* abuts at first in assembling the choke coil 61.

Here, because the first guiding portion 71 is formed higher on an insertion-directional side of the choke coil 61 than the extraction portion 63*a* of the element mounting portion 63 which the choke coil 61 is mounted on, when the choke coil 61 is inserted into the element mounting portion 63, the first connection wire 61*b* can be engaged with the corner portion 71*d* on the element mounting portion 63 side of the first guiding portion 71 in a state in which this choke coil 61 is temporarily retained, i.e., before the choke coil 61 is completely inserted into the element mounting portion 63. Therefore, after the choke coil 61 is mounted on the element mounting portion 63, work such as altering the first connection line 61*b* to be engaged with the first guiding portion 71 is unnecessary, whereby the first connection line 61*b* can be easily engaged with the first guiding portion 71.

Thus, in this power supply apparatus 24, because the first guiding portion 71 retaining the first connection line 61*b* is formed higher on the insertion-directional side of the choke coil 61 than the extraction portion 63*a* of the element mounting portion 63 on which the choke coil 61 is mounted, the first connection line 61*b* can be easily engaged with the first guiding portion 71 in inserting the choke coil 61 into the element mounting portion 63. Therefore, assembling characteristics of the choke coil 61 to the brush holder 31 can be enhanced.

Also, in this power supply apparatus 24, because the first guiding portion 71 retaining the first connection line 61*b* is formed higher on the insertion-directional side of the choke coil 61 than the extraction portion 63*a* of the element mounting portion 63 on which the choke coil 61 is mounted, when the first connection line 61*b* is engaged with the corner portion 71*d* of the first guiding portion 71, the first connection line 61*b* can be easily altered (formed) by pivoting on the corner portion 71*d* from an above-mentioned state. This makes it easy to shape the first connection line 61*b* of the choke coil 61 while being retained by the first guiding portion 71, whereby the assembling characteristics of the choke coil 61 to this brush holder 31 can be enhanced.

Further, in this power supply apparatus 24, because the first connection line 61*b* of the choke coil 61 is retained by the first guiding portion 71, an insulation property of this choke coil 61 can be enhanced by preventing this first connection line 61*b* from contacting with a different-polarity conductive member etc. provided to the brush holder 31. Namely, by providing the pair of guiding walls 71*a* and 71*b* and the groove portion 71*c* to the first guiding portion 71, the first connection line 61*b* can be retained certainly by the guiding walls 71*a* and 71*b*, and also the first connecting line 61*b* can be certainly prevented from contacting with the different-polarity conductive member by the guiding walls 71*a* and 71*b*.

Still further, in this power supply apparatus 24, because the groove portion 71*c* of the first guiding portion 71 is formed into a V-shaped cross-section, the first connection line 61*b* can be easily disposed and retained on a bottom side of the groove portion 71*c* of the first guiding portion 71, whereby assured retention and drawing work of the first connection line 61*b* can be also made easy.

Figure 15:
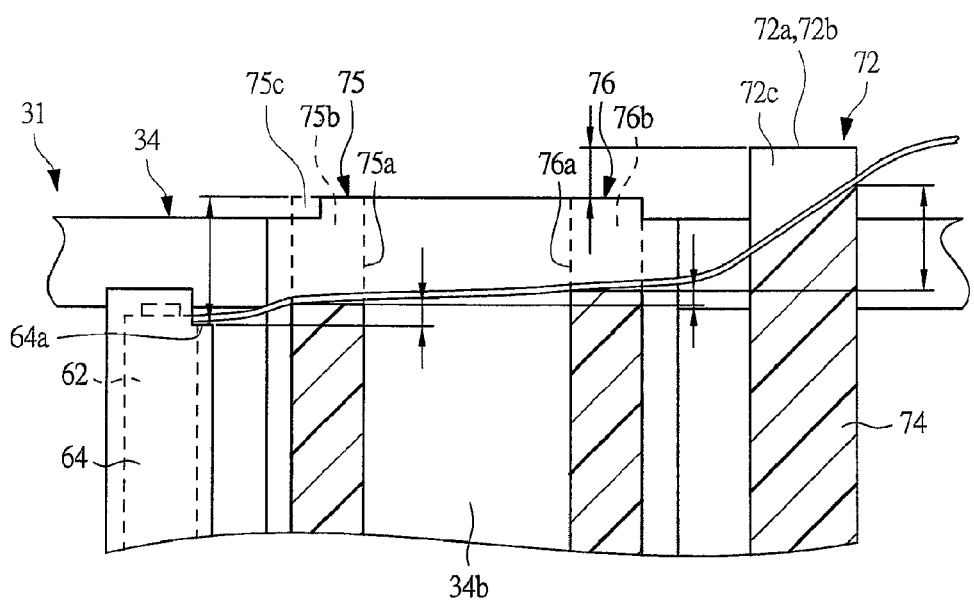
FIG. 15 is a sectional view showing a position relation between the other of the element mounting portions and second to fourth guiding portions.

FIG. 15 is a sectional view showing a position relation between the other of the element mounting portions and second to fourth guiding portions.

In this brush holder 31, a third guiding portion 75 and a fourth guiding portion 76 are provided so that the first connection line 62b of the choke coil 62 mounted on the other element mounting portion 64 can be retained between this element mounting portion 64 and the second guiding portion 72 along the side wall 34b of the holder main body 34. These guiding portions 75 and 76 have respective structures in which the side wall 34b of the holder main body 34 serves as one of guiding walls, and groove portions 75b and 76b are provided between this side wall 34b and guiding walls 75a and 76a. Also, an end portion of the guiding wall 75a of the third guiding portion 75 on the element mounting portion 64 side is provided with a corner portion 75c on which the first connection line 62b abuts at first in assembling the choke coil 62. Tip portions of the respective guiding walls 75a and 76a are formed higher on the insertion-directional side of the choke coil 62 than the extraction portion 64a of the other element mounting portions 64. Also, the tip portions of the guiding walls 75a and 76a of the third and fourth guiding portions 75 and 76 are formed higher on the insertion-directional side of the choke coil 62 than the guiding walls 72a and 72b of the second guiding portion 72. In other words, in this brush holder 31, the farther guiding walls 72a and 72b of the second guiding portion 72 with respect to the extraction portion 64a of the other element mounting portion 64 are formed higher on the insertion-directional side of the choke coil 62 than the nearer guiding walls 75a and 76a of the third and fourth guiding portions 75 and 76. Thereby, when the choke coil 62 is inserted into the element mounting portion 64, the first connection wire 62b can be engaged with the corner portion 75c on the element mounting portion 64 side of the third guiding portion 75 in a state in which this choke coil 62 is temporarily retained, i.e., before the choke coil 62 is completely inserted into the element mounting portion 64. Therefore, after the choke coil 62 is mounted on the element mounting portion 64, work such as altering the first connection line 62b to be engaged with the third guiding portion 75 is unnecessary, and the first connection line 62b can be easily engaged with the third guiding portion 75. Then, by the same cable-laying manner, the first connection line 62b disposed in the third guiding portion 75 can be engaged successively with the fourth guiding portion 76 and the second guiding portion 72. In other words, in shaping the first connection line 62b of the choke coil 62 along the respective guiding portions 75, 76, and 72, at first, the first connection line 62b is engaged with the corner portion 75c of the guiding wall 75a of the third guiding portion 75 located on a side closer to the element mounting portion 64, the first connection line 62b is easily altered (formed) using the corner portion 75c as a pivot from an above-mentioned state, and, similarly thereto, the first connection line 62b can be altered also at locations of the fourth guiding portion 76 and the second guiding portion 72, whereby work of the drawing of the first connection line 62b is facilitated.

Thus, in this power supply apparatus 24, a plurality of guiding portions 72, 75, and 76 provided to the brush holder 31 are formed higher on the insertion-directional side of the choke coil 62 as becoming farther from the extraction portion 64a, so that while the first connection line 62b of the choke coil 62 is retained by the guiding portions 72, 75, and 76, work of drawing the first connection line 62b on the brush holder 31 can be made easy.

As shown in FIG. 14, at the base end of the cylindrical pillar portion 73 on which the first guiding portion 71 is provided, a threaded hole 81 opened on the back side of the base wall 34c is formed in parallel to the axial direction of the commutator 23, and the screw member 41 for fixing, to the brush holder 31, the leaf spring 38a to which the brush 32a is attached, is screwed to this threaded hole 81 in parallel to the axial direction of the commutator 23. Similarly, although being not shown in detail, at the base end of the cylindrical pillar portion 74 on which the second guiding portion 72 is provided, the threaded hole opened on the back side of the base wall 34c is formed in parallel to the axial direction of the commutator 23, and the screw member 41 for fixing, to the brush holder 31, the leaf spring 38b to which the brush 32b is attached, is screwed to this threaded hole in parallel to the axial direction of the commutator 23.

In other words, the first guiding portion 71 is disposed coaxially with the screw member 41 for fixing, to the brush holder 31, the leaf spring 38a to which the one brush 23a is attached, and the second guiding portion 72 is disposed coaxially with the screw member 41 for fixing, to the brush holder 31, the leaf spring 38b to which the other brush 23b is attached. Thereby, length of the threaded hole 81 can be made larger by using interiors of the first and second guided portions 71 and 72, and further axial length of the screw member 41 can also be secured larger, whereby assured fixture of the leaf spring 38b can be obtained. Also, without providing new disposition spaces of the first and second guiding portions 71 and 72, this power supply apparatus 24 and the power window motor 11 to which this power supply apparatus 24 is provided can be downsized.

Thus, in this power supply apparatus 24, the respective guiding portions 71 and 72 are disposed coaxially with the screw members 41 for fixing the leaf springs 38a and 38b to which the brushes 32a and 32b are attached, so that these guiding portions 71 and 72 can be efficiently disposed in a limited space over the brush holder 31, and this power supply apparatus 24 of the power window motor 11 can be downsized.

Also, in this power supply apparatus 24, the respective guide portions 71 and 72 are formed at the tips of the cylindrical pillar portions 73 and 74 protruding from the base wall 34c of the brush holder 31 in the axial direction of the commutator 23, and the threaded holes 81 in which the screw members 41 are screwed are formed at the base ends of the cylindrical pillar portions 73 and 74, so that layout characteristics of these guiding portions 71 and 72 and the screw members 41 are enhanced, and this power supply apparatus 24 can be further downsized.

Figure 16A:
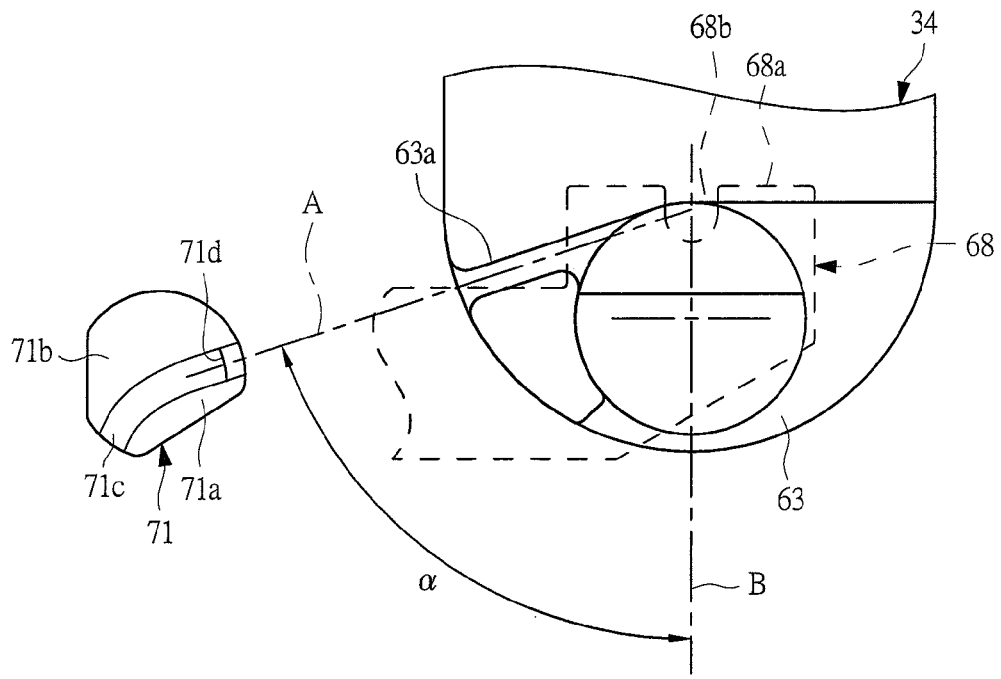
FIG. 16A is an explanatory view showing a position relation between a connection portion of the lead plate disposed in a bottom-side end portion of one of the element mounting portions and an extraction portion provided to an inserting-side end portion of this element mounting portion.
Figure 16B:
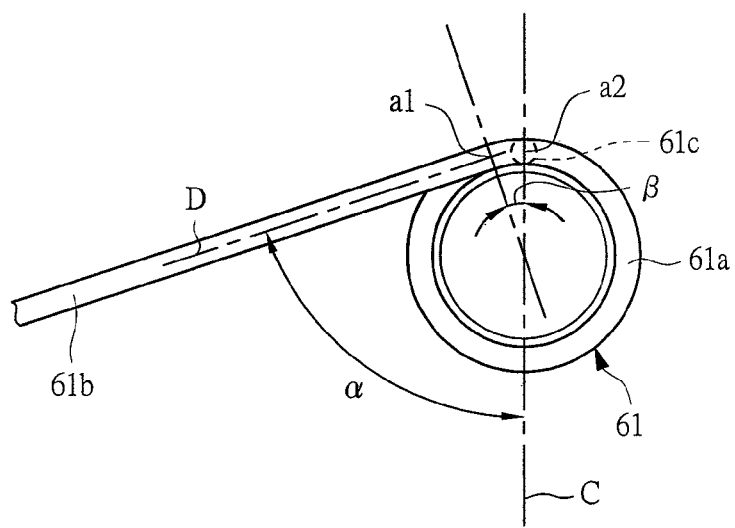
FIG. 16B is an explanatory view showing a relation between extraction positions of a first connection line and a second connection line of the choke coil.

FIG. 16A is an explanatory drawing showing a position relation between a connection portion of the lead plate disposed at a bottom-end side portion of one of the element mounting portions and an extraction portion provided to an insertion-side end portion of this element mounting portion, and FIG. 16B is an explanatory drawing showing a relation between extraction positions of the first and second connection lines of the choke coil.

As shown in FIG. 16A, the extraction portion 63a provided to the insertion-side end portion of the one element mounting portion 63 is formed into such a groove shape at a semi-cylinder portion of this element mounting portion 63 as to be tangential to the coil main body 61a of the choke coil 61 mounted on this element mounting portion 63 and to extend along Line A passing a center located on an element mounting portion 63 side of the groove portion 71c of the first guiding portion 71 adjacent to this element mounting portion 63. Also, as shown in FIG. 13, in the bottom-side end portion of the one element mounting portion 63, a bottom wall 82 is provided integrally with the base wall 34c, and at this bottom wall 82, the connection portion 68a of the lead plate 68 is disposed as a connection lead member to be connected to the second connection line 61c of the choke coil 61. As described above, the one end of this lead plate 68 is connected to the one brush 32a by the screw member 41, and the connection portion 68a is provided at the other end thereof. A slit 68b into which the second connection line 61c is inserted is formed at the tip portion of this connection portion 68a, and, as shown in FIG. 16A, this slit 68b is disposed in the bottom portion of the element mounting portion 63 so as to have a predetermined relative position with respect to the extraction portion 63a with reference to the axis of the choke coil 61, i.e., the axis of the element mounting portion 63. In other words, a mutual relative position is defined so that Line B passing the axis of element mounting portion 63 and the axis of the slit 68b and Line A forming the extraction portion 63a form an angle "α".

On the other hand, as shown in FIG. 16B, extraction positions of the first connection line 61b and the second connection line 61c of the choke coil 61 with reference to their axes are set at a predetermined position relation. In other words, when being viewed axially, an extraction positional of the first connection line 61b and an extraction position a2 of the second connection line 61c are set so as to form an angle "β" centering on their axes, whereby Line C passing the axis and the second connection line 61c and Line D indicating an extraction direction of the first connection line 61b form the angle α. Thus, the position relation between the extraction positions a1 and a2 of the first connection line 61b and the second connection line 61c of the choke coil 61 is identical to the position relation between the extraction position 63a provided to the element mounting portion 63 and the connection portion 68a of the lead plate 68. Therefore, by matching the first connection line 61b with the extraction portion 63a to insert the choke coil 61 into the element mounting portion 63, the first connection line 61b can be engaged with the first guiding portion 71, and the second connection line 61c can be inserted into the slit 68b of the connection portion 68a provided to the lead plate 68.

Similarly, although being not shown in detail, a position relation between the extraction portion 64a of the other element mounting portion 64 and a connection portion 69a of a lead plate 69 serving as a connection lead member provided at the bottom of the element mounting portion 64 is also set at the same position relation as that in the one element mounting portion 63. Therefore, by matching the first connection line 62b with the extraction portion 64a to insert the choke coil 62 into the other element mounting portion 64, the second connection line 62c can be inserted into a slit of the connection portion 69a provided to the lead plate 69. Also, a position relation between the extraction portion 63a provided to the one element mounting portion 63 and the first guiding portion 71 is set so as to be identical to the position relation between the extraction portion 64a provided to the other element mounting portion 64 and the third guide portion 75 closest to the element mounting portion 64, so that by matching the choke coil 62 with the extraction portion 64a of the other element mounting portion 64 to insert the choke coil 62 into the element mounting portion 64, the first connection line 62b can be engaged with the third guiding portion 75.

Thus, in this power supply apparatus 24, the position relation between the extraction positions a1 and a2 with reference to the axes of the first and second connection lines 61b and 61c of the choke coil 61 is set so as to be identical to the position relation between the extraction portion 63a from which the first connection line 61b is extracted and the connection portion 68a of the lead plate 68 with reference to the axis of the choke coil 61. For this reason, even if the slit 68b of the connection portion 68a of the lead plate 68 disposed on the bottom portion side of the element mounting portion 63, and the tip portion of the second connection line 61c of the choke coil 61 are not visible, the second connection line 61c can be certainly connected to the connection portion 68a of the lead plate 68 by matching the first connection line 61b with the extraction portion 63a to insert the choke coil 61 into the element mounting portion 63.

Also, in this power supply apparatus 24, the pair of element mounting portions 63 and 64 is provided to the brush holder 31, the position relation between the connection portions 68a and 69a corresponding to the respective element mounting portions 63 and 64 is set so as to be identical to that between the extraction portion 63a and 64a corresponding thereto, and furthermore the position relation between the extraction portion 63a of the one element mounting portion 63 and the first guiding portion 71 is set so as to be identical to that between the extraction portion 64a of the other element mounting portion 64 and the third guiding portion 75. Therefore, the choke coils 61 and 62 having the same size as that of the element mounting portions 63 and 64 can be used, whereby the number of types of the choke coils used in this power supply apparatus 24 is decreased, and costs of this power supply apparatus can be reduced.

Next, a method of mounting the choke coil 61 to such a brush holder 31 will be described. Incidentally, because the mounting method of the choke coil 62 is basically similar, its explanation will be omitted.

At first, the first and second connection lines 61b and 61c of the choke coil 61 are shaped so that each of their extraction positions has a predetermined position relation with reference to their axes.

Next, the choke coil 61 is inserted into the element mounting portion 63 from the other axial-directional end side, i.e., a side where the second connection line 61c is provided. Then, the first connection line 61b is engaged with the corner portion 71d of the first guiding portion 71 in a state in which the choke coil 61 is temporarily retained by the element mounting portion 63, i.e., a condition before the choke coil 61 is not fully inserted into the element mounting portion 63.

When the first connection line 61b is engaged with the corner portion 71d, the choke coil 61 is inserted further into a back of the element mounting portion 63 in a state of matching the first connection line 61b with the extraction portion 63a. When the choke coil 61 is struck to a bottom wall 82 of the element mounting portion 63, the second connection line 61c is inserted into the slit 68b of the connection portion 68a in the lead plate 68 by itself. Then, the second connection line 61c inserted into the slit 68b is connected to the connection portion 68a by soldering etc. Incidentally, while this mounting operation of the choke coil 61 is performed, as described above, work of altering (forming) for disposing the first connection line 61b in the groove portion 71c of the first guiding portion 71 is done simultaneously.

Figure 17:
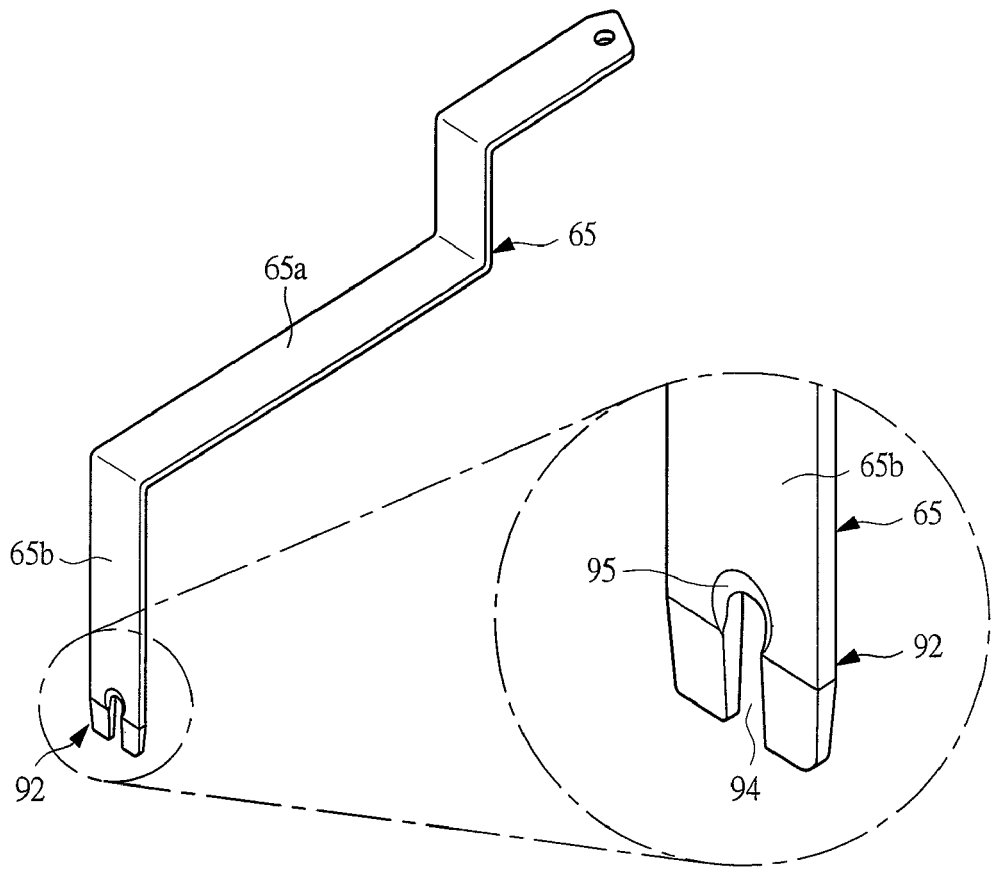
FIG. 17 is a perspective view showing details of a lead plate and a connection terminal portion provided to this lead plate.
Figure 18:
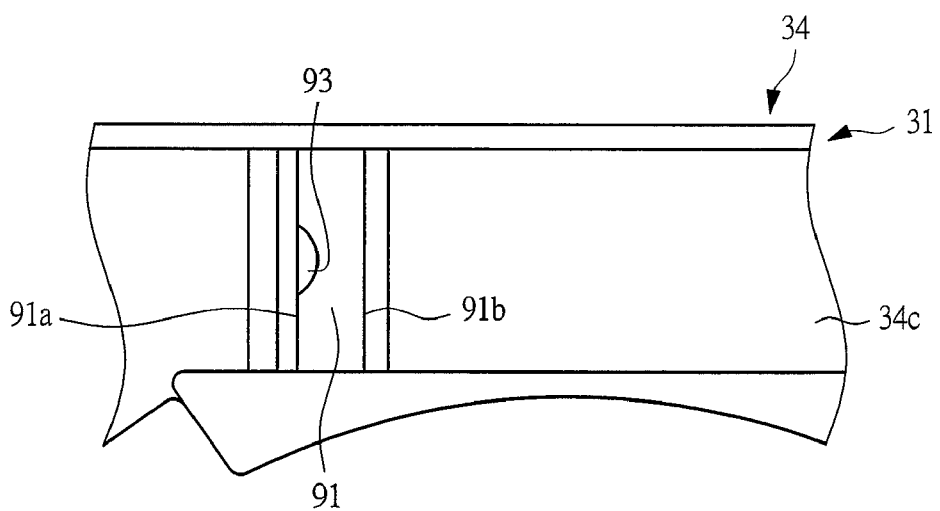
FIG. 18 is a front view showing an insertion hole into which the lead plate shown in FIG. 17 is inserted.
Figure 19A:
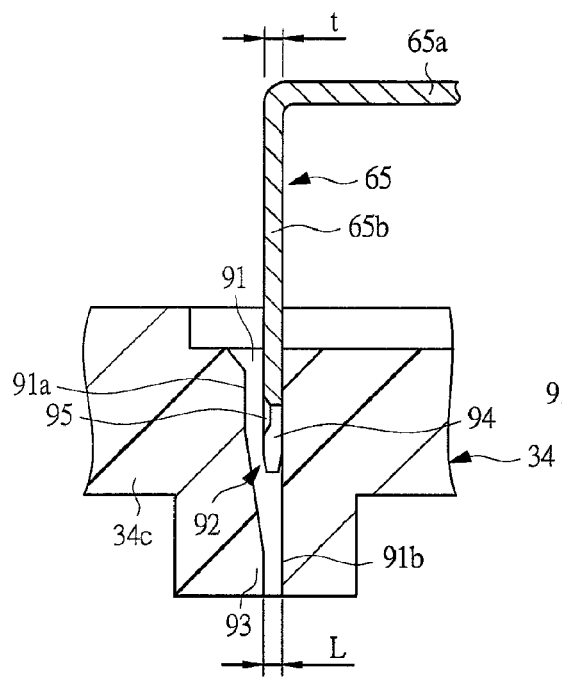
FIGS. 19A and 19B each are a sectional view showing an inserting procedure of the lead plate into the insertion hole.
Figure 19B:
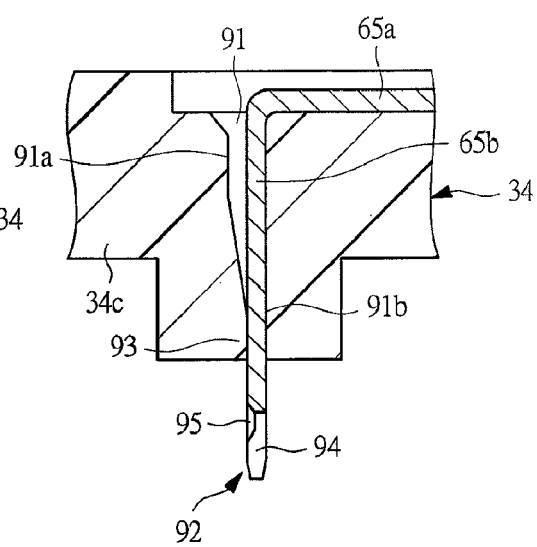

FIG. 17 is a perspective view showing details of the lead plate and a connection terminal portion provided to this lead plate; FIG. 18 is a front view showing an insertion hole into which the lead plate illustrated in FIG. 17 is inserted; FIGS. 19A and 19B each are a sectional view showing an inserting procedure of the lead terminal into the insertion hole.

As shown in FIG. 6, the lead plate 65 serving as an insertion lead member, which connects the first connection line 61b of the choke coil 61 wired on the front side of the brush holder 31 and the circuit breaker 66 protruding to the back side of the brush holder 31, has a main body portion 65a disposed on the back side of the base wall 34c; and an insertion portion 65b bent perpendicularly to the main body portion 65a, wherein the main body portion 65a is connected to one terminal of the circuit breaker 66 on the back side of the brush holder 31. On the other hand, an insertion hole 91 penetrating through this base wall 34c in the axial direction of the commutator 23 is formed in the base wall 34c of the brush holder 31, and the insertion portion 65b of the lead plate 65 is inserted into this insertion hole 91 from its tip, and protrudes to the front side of the brush holder 31. Then, as shown in FIG. 6, the first connection line 61b of the choke coil 61 is connected, on the front side with respect to the base wall 34c, to a connection terminal portion 92 provided to a tip of the insertion portion 65b. In other words, the lead plate 65 is connected to the brush 32a on the front side of the brush holder 31 via the choke coil 61, and to the back-side power supply terminal 43d of the first lead plate 43 on the back side via the circuit breaker 66 and the lead plate 67.

Here, as shown in FIG. 18, the insertion hole 91 is formed into a quadrate section having a pair of wide inner surfaces 91a and 91b opposite to both thickness-directional surfaces of the lead plate 65, wherein a semi-circle cross-sectional protrusion 93 is formed in the one wide inner surface 91a. As shown in FIG. 19, this protrusion 93 is positioned at a substantially middle portion in a width direction of the wide inner surface 91a, and is formed integrally with the base wall 34c and into such a taper shape that its protrusion amount is gradually increased from an substantially middle portion in an axial direction of the insertion hole 91 toward a front surface side of the base wall 34c. At an opening portion on a front surface side of the base wall 34c, a gap "L" between the protrusion 93 and the other wide inner surface 91b opposing to this protrusion 93 is narrower than thickness "t" of the lead plate 65. Thereby, when the insertion portion 65b of the lead plate 65 is inserted into the insertion hole 91, the protrusion 93 contacts with the lead plate 65 elastically, i.e., the protrusion 93 deforms elastically in a crushing direction, and by its elasticity, the insertion portion 65b of the lead plate 65 is pressed to the other wide inner surface 91b. Therefore, the insertion portion 65b of the lead plate 65 is positioned to the brush holder 31 with reference to the other wide inner surface 91b, and is prevented from falling out of the insertion hole 91 due to friction occurring between the wide inner surface 91b and the protrusion 93.

On the other hand, as enlargedly shown in FIG. 17, the connection terminal portion 92 formed at a tip of the insertion portion 65 side inserted into the insertion hole 91 has a notch groove, i.e., a slit 94 which extends from the tip of the insertion portion 65b in its axial direction, i.e., in a direction in which the insertion portion 65b is inserted into the insertion hole 91. This slit 94 is formed in a middle portion in a width direction of the insertion portion 65b, whereby the tip of the insertion portion 65b is formed in a fork shape with a pair of protruding portions. Also, on a surface of the connection terminal portion 92 side opposing to the protrusion 93, a tapered surface 95 chamfering a root portion of the slit 94 is formed so that when the insertion portion 65b is inserted into the insertion hole 91, this tapered surface 95 passes over the protrusion 93. And, when the insertion portion 65b is inserted into the insertion hole 91, the connection terminal portion 92 protrudes to a front side of the base wall 34c, and the first connection line 61b of the choke coil 61 inserted into the slit 94 is connected to the connection terminal portion 92 by soldering et al.

Next, a mounting method of this lead plate 65 onto the brush holder 31 will be explained.

At first, the connection terminal portion 92, which has the slit 94 and the tapered surface 95 at the tip of the insertion portion 65b of the lead plate 65, is preliminarily formed, and the protrusion 93 is formed on the wide inner surface 91a of the insertion hole 91 of the brush holder 31.

Then, from the back side of the brush holder 31, the insertion portion 65b of the lead plate 65 at which the connection terminal portion 92 is formed is inserted into the insertion hole 91 so that the tapered surface 95 provided to the connection terminal portion 92 passes over the protrusion 93, and the connection terminal portion 92 is caused to protrude to the front side of the brush holder 31. At this time, the insertion portion 65b inserted into the insertion hole 91 causes its tapered surface 95 to contact with a surface of the tapered protrusion 93, thereby moving so as to gradually ride onto the protrusion 93. Therefore, the connection terminal portion 92 passes the protrusion 93 without cutting the protrusion 93 shaped integrally with the resin-made holder main body 34.

When the connection terminal portion 92 protrudes to the front side of the brush holder 31, the first connection line 61b of the choke coil 61 is connected to the connection terminal portion 92, and an opposite tip portion of the lead plate 65 is connected to the circuit breaker 66.

Thus, in this power supply apparatus 24, because the tapered surface 95 is formed in the root portion of the slit 94 formed at the tip of the lead plate 65, when this lead plate 65 is inserted into the insertion hole 91, the lead plate 65 gradually rides onto the protrusion 93 on the tapered surface 95, whereby the protrusion 93 is not cut by an edge of the root portion of the slit 94. Therefore, the protrusion 93 is prevented from being cut by the lead plate 65, the lead plate 65 is securely pressed to the other wide inner surface 91b by the protrusion 93, and the lead plate 65, namely, the connection terminal portion 92 provided to the tip of the lead plate 65 can be securely positioned. Also, since the connection terminal portion 92 is securely positioned, connecting work of the choke coil 61 to the connection terminal portion 92 can be facilitated.

Also, because the first connection line 61b of the choke coil 61 can be guided to the slit 94 by the tapered surface 95 formed in the root portion of the slit 94, the connecting work of the choke coil 61 to the connection terminal portion 92 of the lead plate 65 can be facilitated.

Figure 20:
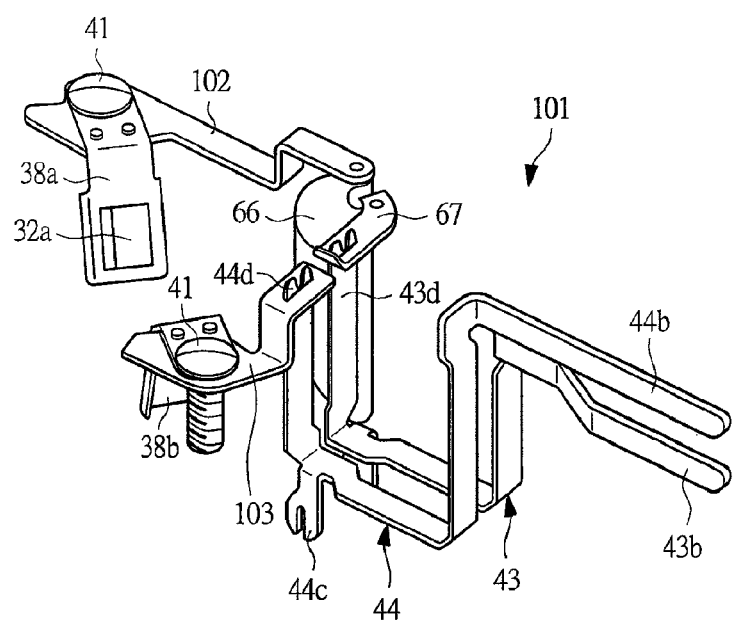
FIG. 20 is a perspective view showing a modification of the power supply circuit illustrated in FIG. 6.

FIG. 20 is a perspective view showing a modification of the power supply circuit illustrated in FIG. 6.

The power supply circuit 33 shown in FIG. 6 is provided with the pair of choke coils 61 and 62, and the first and second lead plates 43 and 44 are connected to their corresponding brushes 32a and 32b via these choke coils 61 and 62, respectively. In contrast, depending on a specification of the power window motor 11, the choke coils 61 and 62 serving as noise prevention elements may be removed. In this case, a power supply circuit 101 having a structure as shown in FIG. 20 is provided to the brush holder 31 identical to that shown in FIG. 6.

Here, in this brush holder 31, the first and second lead plates 43 and 44, which electrically connect the connector portion 36 and the holder main body 34, have the pairs of terminals 43c and 43d, and 44c and 44d protruding to the front side and the back side of the brush holder 31, respectively, and the pair of element mounting portions 63 and 64 formed at the holder main body 34 is formed so as to penetrate through the base wall 34c in the axial direction of the commutator 23. Therefore, the power supply circuit can be constituted so as to be optimum paths according to each specification with or without the choke coils 61 and 62. In other words, even if connection portions to the first and second lead plates 43 and 44 according to presence or absence of the choke coils 61 and 62 are disposed on any of the front and back sides of the brush holder 31, since the connection to the first and second lead plates 43 and 44 can be performed selectively on either front or back side of the brush holder 31, a wiring path of the power supply circuit can be simplified regardless of whether the choke coil 61 and 62 exist. For example, in a case shown in FIG. 20, the leaf spring 38a of the one brush 32a is connected to the back-side power supply terminal 43d of the first lead plate 43 by a lead plate 102 replaced with the lead plate 65 via the circuit breaker 66 and the lead plate 67, and the leaf spring 38b of the other brush 32b is connected to the back-side power supply terminal 44d of the second lead plate 44 by a lead plate 103.

Thus, in this brush holder 31, because the holder-main-body side terminals of the first and second lead plates 43 and 44 are provided on both of one side and the other side of the holder main body 34 in the axial direction with respect to the base wall 34c of the holder main body 34, and the choke coils 61 and 62 are mounted onto the element mounting portions 63 and 64 axially penetrating through the base wall 34c. Therefore, wirings from the respective brushes 32a and 32b can be connected selectively to the lead plates 43 and 44 on either of one side or the other side of the base wall 34c in the axial direction depending on the presence or absence of the choke coils 61 and 62. Thereby, in each specification with and without the choke coils 61 and 62, the wiring paths of the power supply circuits 33 and 101 provided to this brush holder 31 can be simplified.

Also, in this brush holder 31, the pair of element mounting portions 63 and 64 is provided to the holder main body 34, and the choke coils 61 and 62 are respectively mounted to these element mounting portions 63 and 64, so that the choke coils 61 and 62 can be provided between the lead plates 43 and 44 and the brushes 32a and 32b, respectively.

Needless to say, the present invention is not limited to the aforementioned embodiments, and can be variously modified within a scope of not departing from the gist of the invention. For example, in the present embodiment, the present invention is applied to the power window motor 11 in which the reducer 13 is attached to the motor main body 12, but without being limited to the above application, the present invention can be applied to other electric motors such as an electric motor having no reducer 13. Also, without being limited to the power window motor 11 used as a driving source of the power window apparatus, for example, the present invention may be applied to a slim-type electric motor mounted inside a vehicular panel, such as a driving source of a vehicular automatic opening/closing apparatus which automatically drives opening/closing bodies such as a sliding door, a back door, and a sunroof.

Also, in the present embodiment, the retaining portion 56 is provided in the second mold 53, but the present embodiment is not limited to such a structure, and may be provided in the first mold 52.

Also, in the present embodiment, the choke coils 61 and 62 are used as noise prevention elements, but the present embodiment is not limited to such a structure, and as long as an element is for reducing noise on the power supply circuit, for example, a varistor or condenser, etc. may be used as the above element.

Further, in the present embodiment, the first connection line 61b of the choke coil 61 is connected to the back-side power supply terminal 43d of the first lead plate 43, and the second connection line 61c of the choke coil 61 is connected to the front-side power supply terminal 44c. However, the present embodiment is not limited to such a structure, and depending on a constitution of the power supply circuit 33, the first and second connection lines 611b and/or 61c may be connected to either one of the front-side power supply terminals 43c and 44c and the back-side power supply terminals 43d and 44d of the corresponding lead plates 43 and 44.

INDUSTRIAL APPLICATION

The present invention can be used to downsize an electric motor equipped with a brush holder in which a holder main body and a connector portion are formed integrally.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An electric motor having a brush holder formed by a resinous material and integrally with: a holder main body disposed inside a pair of motor housings and retaining a pair of brushes slidably contacting with a commutator; a power-supply connector portion disposed outside the motor housings and connected detachably to an external connector; and a coupling portion provided so as to protrude outside the motor housings from the holder main body and coupling the holder main portion and the connector portion, the motor comprising:
  a first lead member formed by a metal plate with a conductive property and including: a main body portion embedded into the holder main body, the coupling portion, and the connector portion; a connector side terminal extended from one end of the main body portion and protruding from the connector portion; and a holder-main-body side terminal extended from another end of the main body portion to the axial direction of the commutator and protruding from the holder main body and connected to one of the brushes; and
  a second lead member formed by a metal plate with a conductive property and including: a main body portion embedded into the holder main body, the coupling portion, and the connector portion alongside of the first lead member; a connector side terminal extended from one end of the main body portion and protruding from the connector portion; and a holder-main-body side terminal extended from another end of the main body portion to the axial direction of the commutator and protruding from the holder main body and connected to the other of the brushes,
  wherein each of the connector side terminals of the first and second lead members is disposed so as to match its width direction with an axial direction of the commutator and to be mutually aligned in the width direction,
  each of the main body portions of the first and second lead members is twisted perpendicularly to the connector side terminal with reference to an axis at a base end of the connector portion and the twisted direction of the main body portions is the opposite direction in each other, and disposed in the coupling portion so as to match its thickness direction with the axial direction of the commutator and to be mutually aligned in the width direction, and
  the brush holder is clamped and fixed to the pair of motor housings,
  the holder main body comprises:
    a base wall extending along a plane orthogonal to an axial direction of the commutator, and a pair of element mounting portions which are disposed through the base wall in the axial direction of the commutator, and in which noise prevention elements are respectively inserted.

2. The electric motor according to claim 1, wherein the connector portion is opened outside a radial direction of the commutator.

3. The electric motor according to claim 2, wherein the connector portion is disposed so as to be shifted in the axial direction of the commutator with respect to the holder main body.

4. The electric motor according to claim 1,
wherein one of the noise prevention elements is connected between one of the brushes and the first lead member,
the other of the noise prevention elements is connected between the other of the brushes and the second lead member, and
the brush holder is provided with a first guiding portion for retaining a first connection line of one the noise prevention elements inserted in the element mounting portions at a predetermined position of the brush holder, and a second guiding portion for retaining a first connection line of the other of the noise prevention elements inserted in the element mounting portions at a predetermined position of the brush holder.

5. The electric motor according to claim 4, wherein
the first guiding portion is provided with a corner portion with which the first connection line of one of the noise prevention elements is engaged, and
the second guiding portion is provided with a corner portion with which the first connection line of the other of the noise prevention elements is engaged.

6. A power window apparatus for a vehicle comprising:
an armature; a motor yoke rotatably built in the armature; a reduction mechanism constituted by a worm formed integrally with a motor shaft of the armature and by a worm wheel meshing with the worm; a gear case fixed to the motor yoke and built in the reduction mechanism; and an output shaft extending in a direction orthogonal to the motor shaft at an axis of the worm wheel and protruding from the gear case;
a brush holder formed by a resinous material and integrally with: a holder main body disposed inside the motor yoke and the gear case and retaining a pair of brushes slidably contacting with a commutator; a power-supply connector portion disposed outside the motor housing and connected detachably to an external connector; a coupling portion provided so as to protrude outside the motor yoke from the holder main body and coupling the holder main body and the connector portion; and
the brush holder including:
a first lead member formed by a metal plate with a conductive property, the first lead member having: a main body portion embedded into the holder main body, the coupling portion, and the connector portion; a connector side terminal extended from one end of the main body portion and protruding from the connector portion; and a holder-main-body side terminal extended from another end of the main body portion to the axial direction of the commutator and protruding from the holder main body and connected to one of the brushes; and
a second lead member formed by a metal plate with a conductive property, the second lead member having: a main body portion embedded into the holder main body, the coupling portion, and the connector portion alongside the first lead member; a connector side terminal extended from one end of the main body portion and protruding from the connector portion; and a holder-main-body side terminal extended from another end of the main body portion to the axial direction of the commutator and protruding from the holder main body and connected to the other of the brushes,
wherein each of the connector side terminals of the first and second lead members is disposed so as to match its width direction with an axial direction of the commutator and to be mutually aligned in the width direction, and each of the main body portions of the first and second lead members is twisted perpendicularly to the connector side terminal with reference to an axis at a base end of the connector portion and the twisted direction of the main body portions is the opposite direction in each other, and disposed in the coupling portion so as to match its thickness direction with the axial direction of the commutator and to be mutually aligned in the width direction,
wherein the holder main body comprises:
a base wall extending along a plane orthogonal to an axial direction of the commutator, and
a pair of element mounting portions which are disposed through the base wall in the axial direction of the commutator, and in which noise prevention elements are respectively inserted,
wherein the electric motor is fixed inside a door panel of the vehicle so that the axial direction of the output shaft is a thickness direction of the door panel of the vehicle.

7. The power window apparatus according to claim 6,
wherein one of the noise prevention elements is connected between one of the brushes and the first lead member,
the other of the noise prevention elements is connected between the other of the brushes and the second lead member, and
the brush holder is provided with a first guiding portion for retaining a first connection line of one the noise prevention elements inserted in the element mounting portions at a predetermined position of the brush holder, and a second guiding portion for retaining a first connection line of the other of the noise prevention elements inserted in the element mounting portions at a predetermined position of the brush holder.

8. The power window apparatus according to claim 7, wherein
the first guiding portion is provided with a corner portion with which the first connection line of one of the noise prevention elements is engaged, and
the second guiding portion is provided with a corner portion with which the first connection line of the other of the noise prevention elements is engaged.

* * * * *